US011483188B2

(12) United States Patent
Morita et al.

(10) Patent No.: US 11,483,188 B2
(45) Date of Patent: Oct. 25, 2022

(54) CONNECTION DEVICE, ELECTRONIC DEVICE, AND INFORMATION PROCESSING METHOD

(71) Applicant: SONY CORPORATION, Tokyo (JP)

(72) Inventors: Hiroshi Morita, Tokyo (JP); Kazuaki Toba, Tokyo (JP); Kazuo Yamamoto, Tokyo (JP); Masanari Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,373

(22) PCT Filed: Jul. 17, 2019

(86) PCT No.: PCT/JP2019/028174
§ 371 (c)(1),
(2) Date: Jan. 12, 2021

(87) PCT Pub. No.: WO2020/022166
PCT Pub. Date: Jan. 30, 2020

(65) Prior Publication Data
US 2021/0320828 A1    Oct. 14, 2021

(30) Foreign Application Priority Data

Jul. 23, 2018    (JP) ............................. JP2018-138067

(51) Int. Cl.
*H04L 25/49*    (2006.01)
*H04L 7/00*    (2006.01)

(52) U.S. Cl.
CPC ............ *H04L 25/49* (2013.01); *H04L 7/0091* (2013.01)

(58) Field of Classification Search
CPC .... H04L 25/49; H04L 7/0091; H04L 25/4923
See application file for complete search history.

(56) References Cited

U.S. PATENT DOCUMENTS

| 5,010,399 A | 4/1991 | Goodman et al. |
| 5,949,473 A | 9/1999 | Goodman |

(Continued)

FOREIGN PATENT DOCUMENTS

| CA | 2020841 A1 | 1/1991 |
| EP | 408236 A2 | 1/1991 |

(Continued)

OTHER PUBLICATIONS

International Search Report and Written Opinion of PCT Application No. PCT/JP2019/028174 dated Sep. 10, 2019, 08 pages of ISRWO.

*Primary Examiner* — Dac V Ha
(74) *Attorney, Agent, or Firm* — Chip Law Group

(57) ABSTRACT

It is made possible to favorably perform signal transfer between a plurality of daisy-chain-connected devices. There is a communication line for performing communication between a first electronic device and a second electronic device. A data generating section generates first data to be transmitted to the first electronic device. Then, a data input section inputs the first data to a first position on the communication line. In addition, a first data suppressing section is provided at a second position on the communication line, the second position being closer to the second electronic device than the first position is, and the first data suppressing section prevents the first data from being sent to the second electronic device.

13 Claims, 18 Drawing Sheets

(56) References Cited

U.S. PATENT DOCUMENTS

| | | | |
|---|---|---|---|
| 6,236,718 B1 | 5/2001 | Goodman | |
| 6,970,537 B2 | 11/2005 | Goodman | |
| 9,048,934 B1 | 6/2015 | Farjadrad | |
| 2005/0117720 A1 | 6/2005 | Goodman et al. | |
| 2005/0117721 A1 | 6/2005 | Goodman et al. | |
| 2005/0117722 A1 | 6/2005 | Goodman et al. | |
| 2005/0149984 A1 | 7/2005 | Goodman et al. | |
| 2008/0292007 A1* | 11/2008 | Lida | H04L 27/0008 375/257 |
| 2013/0210347 A1* | 8/2013 | Ling | H04B 7/18517 455/41.1 |
| 2017/0366596 A1* | 12/2017 | Han | H04L 1/0006 |

FOREIGN PATENT DOCUMENTS

| | | |
|---|---|---|
| EP | 798923 A2 | 10/1997 |
| JP | 2017-135711 A | 8/2017 |

\* cited by examiner

OUTPUT SIGNAL
OF DRIVER 102

OUTPUT SIGNAL
OF DRIVER 302

OUTPUT SUMMATION SIGNAL
OF DRIVERS 102 AND 302

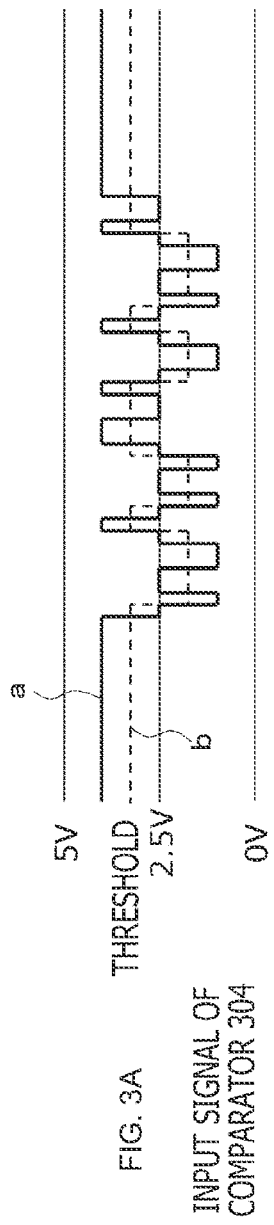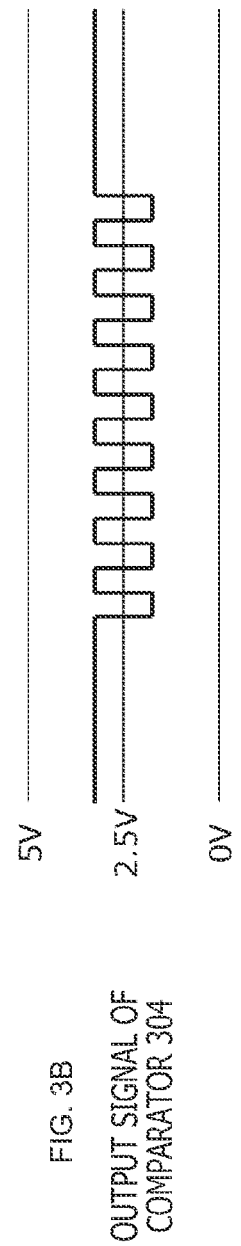

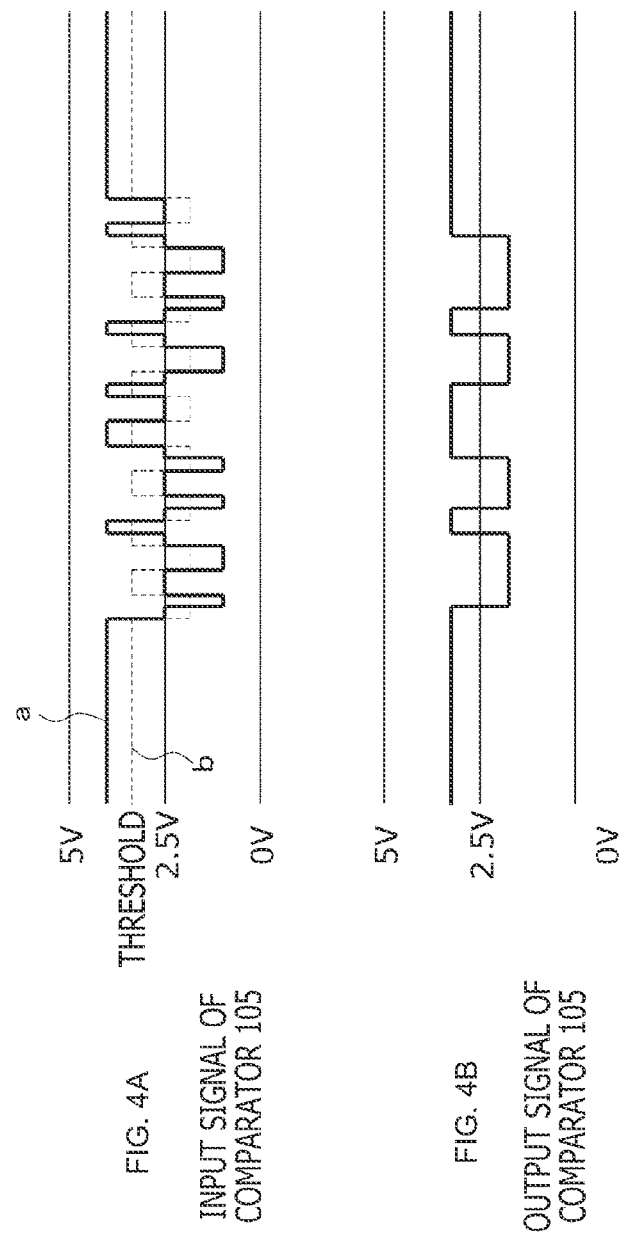

FIG. 9A  AT TIME OF DATA TRANSFER FROM Source TO Sink
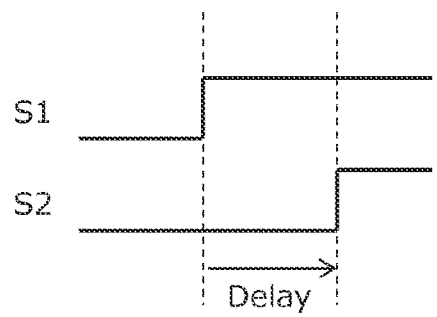
FIG. 9B  AT TIME OF DATA TRANSFER FROM Sink TO Source
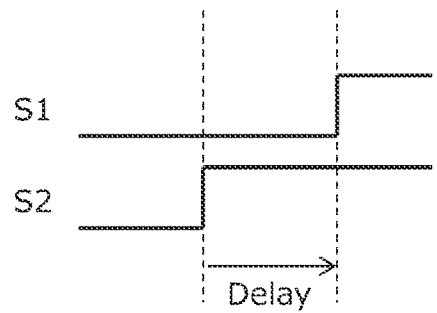

CONNECTION DEVICE, ELECTRONIC DEVICE, AND INFORMATION PROCESSING METHOD

CROSS REFERENCE TO RELATED APPLICATIONS

This application is a U.S. National Phase of International Patent Application No. PCT/JP2019/028174 filed on Jul. 17, 2019, which claims priority benefit of Japanese Patent Application No. JP 2018-138067 filed in the Japan Patent Office on Jul. 23, 2018. Each of the above-referenced applications is hereby incorporated herein by reference in its entirety.

TECHNICAL FIELD

The present technique relates to a connection device, an electronic device, and an information processing method, and in particular relates to a connection device and the like that are suitable to be applied when a signal transfer is performed between a plurality of daisy-chain-connected devices.

BACKGROUND ART

For example, as a technique regarding multi-node communication of daisy-chain-connected multiple devices, PTL 1 describes a technique for transmission of the same information from a master node to all nodes in a daisy-chain-connected multi-node network, and for exchanges of information by slave nodes on the basis of slave addresses allocated to themselves.

In a case where a system is not desirable to send information to be communicated with upstream devices to downstream devices in such multi-node communication of daisy-chain-connected multiple devices, intermediate nodes need to have, for example, function of storing data on memories and determining whether to or not to transmit the data to downstream devices, and extra parts costs for memories and the like, extra examination costs, and the like become necessary.

CITATION LIST

Patent Literature

[PTL 1]
JP 2017-135711A

SUMMARY

Technical Problem

An object of the present technique is to make it possible to favorably perform signal transfers between a plurality of daisy-chain-connected devices.

Solution to Problem

A concept of the present technique lies in a connection device including:
a communication line for performing communication between a first electronic device and a second electronic device;
a data generating section that generates first data to be transmitted to the first electronic device;
a data input section that inputs the first data to a first position on the communication line; and
a first data suppressing section that is provided at a second position on the communication line, the second position being closer to the second electronic device than the first position is, and prevents the first data from being sent to the second electronic device.

In the present technique, there is a communication line for performing communication between a first electronic device and a second electronic device. A data generating section generates first data to be transmitted to the first electronic device. Then, a data input section inputs the first data to a first position on the communication line. In addition, a first data suppressing section is provided at a second position on the communication line, the second position being closer to the second electronic device than the first position is, and the first data suppressing section prevents the first data from being sent to the second electronic device.

For example, the data suppressing section includes a comparator having a positive input terminal, a negative input terminal, and an output terminal. Then, the positive input terminal is connected to the communication line extending toward the first electronic device, the negative input terminal receives an input of the first data, and the output terminal is connected to the communication line extending toward the second electronic device.

In such a manner, in the present technique, the first data is input to the first position on the communication line, and at the second position closer to the second electronic device than the first position is, the first data is prevented from being sent toward the second electronic device. Accordingly, it is possible to send the first data to the first electronic device, and it is possible to prevent the first data from being sent to the second electronic device.

Note that, in the present technique, for example, the data generating section may generate the first data in a first state in which data is transmitted from the first electronic device via the communication line to the second electronic device. In this case, for example, there may further be a first state determining section that determines whether or not the connection device is in the first state. Thereby, the first data is not generated in a case that data is transmitted from the second electronic device via the communication line to the first electronic device. Accordingly, it becomes possible on the side of the first electronic device to receive the first data precisely.

In addition, in the present technique, for example, there may further be a data receiving section that receives second data sent from the first electronic device via the communication line in a second state in which data is transmitted from the second electronic device via the communication line to the first electronic device. In this case, for example, there may further be a second state determining section that determines whether or not the connection device is in the second state. Thereby, in the present technique, it becomes possible to favorably receive the second data sent from the first electronic device via the communication line.

In addition, in this case, for example, there may further be a second data suppressing section that prevents the second data from being sent toward the second electronic device. Thereby, it becomes possible to prevent the second data from being sent toward the second electronic device.

In addition, another concept of the present technique lies in an electronic device including:
a communication line for performing communication with an external device connected via a connection device;

a data generating section that generates first data to be transmitted to the connection device;

a data input section that inputs the first data to a first position on the communication line; and a data receiving section that is provided at a second position on a side of the communication line opposite to the connection device relative to the first position and receives second data sent from the external device, in which the data receiving section has a data suppression function for preventing the first data from being taken out as reception data.

In the present technique, there is a communication line for performing communication with an external device connected via a connection device. A data generating section generates first data to be transmitted to the connection device. A data input section inputs the first data to a first position on the communication line. A data receiving section is provided at a second position on a side of the communication line opposite to the connection device relative to the first position, and the data receiving section receives second data sent from the external device. Here, the data receiving section prevents the first data from being taken out as reception data.

For example, the data receiving section includes a comparator having a positive input terminal, a negative input terminal, and an output terminal. Then, the positive input terminal is connected to the communication line extending toward the connection device, the negative input terminal receives an input of the first data, and the reception data is obtained from the output terminal.

In such a manner, in the present technique, the first data is input to the first position on the communication line, and at the second position on the side of the communication line opposite to the connection device relative to the first position, the second data sent from the external device is received while the first data is prevented from being taken out as reception data. Accordingly, it is possible to send the first data to the connection device, and it is possible to favorably receive the second data from the external device without being influenced by the first data.

Note that, in the present technique, for example, there may further be a determining section that determines whether or not the communication line has a connection to the connection device. In this case, for example, a determination may be made on the basis of a voltage level of the communication line at the time when a predetermined current is made to flow from the communication line. In addition, in this case, for example, the determining section may make a determination on the basis of a voltage level of a power supply line at the time when a switch inserted to the power supply line is opened. By including the determining section in such a manner, it becomes possible to prevent the first data from being sent toward the external device, and to prevent operation errors that can otherwise occur if the first data is sent toward the external device.

Advantageous Effect of Invention

According to the present technique, signal transfers between a plurality of daisy-chain-connected devices can be performed favorably. Note that advantages described in the present specification are merely for illustrative purposes, but advantages of the present technique are not limited to them. There may also be additional advantages.

BRIEF DESCRIPTION OF DRAWINGS

FIGS. 3A and 3B depict figures illustrating one example of an input signal and an output signal of a comparator included in a data suppressing section of the cable.

FIGS. 4A and 4B depict figures illustrating one example of an input signal and an output signal of a comparator included in a data receiving section of the source device.

FIGS. 9A and 9B depict figures illustrating a timing difference between data transitions at times of signal transfers.

DESCRIPTION OF EMBODIMENTS

Figure 1:
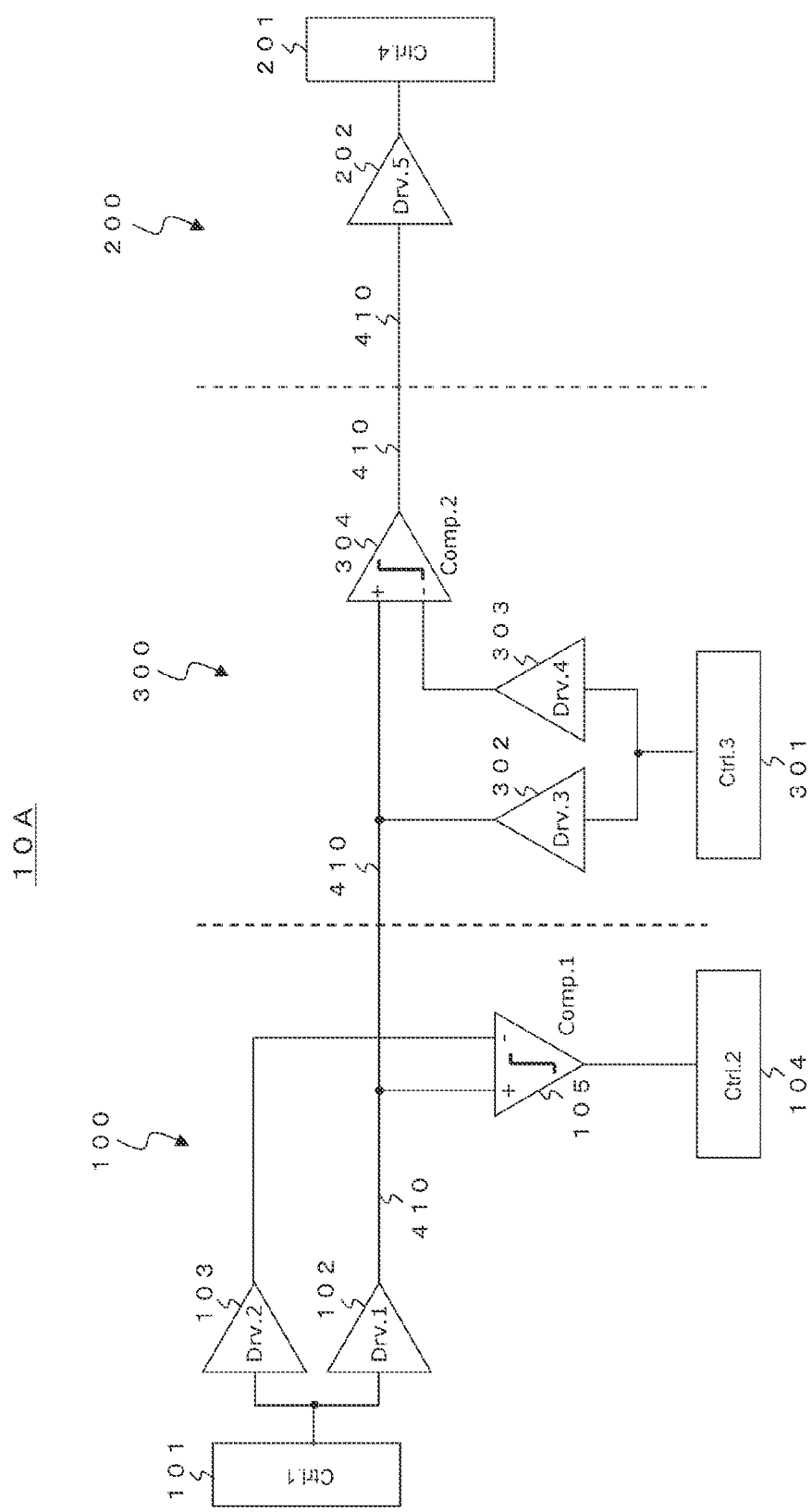
FIG. 1 is a figure illustrating a configuration example of a transfer system as a first embodiment.

In the following, modes for carrying out the invention (hereinafter, called "embodiments") are explained. Note that the explanation is given in the following order:
1. Embodiments
2. Modification Examples 1. Embodiments Configuration of Transfer System First Embodiment FIG. 1 illustrates a configuration example of a transfer system 10A as a first embodiment. The transfer system 10A is an HDMI transfer system using HDMI as a digital interface, for example, but is not limited to it. Note that "HDMI" is a registered trademark.

The transfer system 10A has a source device 100, a sink device 200, and a cable 300 connecting the source device 100 and the sink device 200. In the transfer system 10A, full duplex communication is enabled in a segment between the source device 100 and the cable 300. The transfer system 10A is configured such that communication from the source device 100 to the sink device 200 and communication from the cable 300 to the source device 100 can individually be performed independently, and communication contents from the cable 300 to the source device 100 are not conveyed to the sink device 200. For example, a DDC line, a utility line or the like can be used as a communication line 410 when the cable is an HDMI cable, but the communication line 410 is not limited to them.

In a state in which data is transmitted from the source device 100 to the sink device 200 via the communication line 410, the cable 300 can input first data at a first position on the communication line 410 and transmit the data to the source device 100. In this case, on the cable 300, a process for preventing the first data from being sent to the sink device 200 is performed at a second position on the communication line 410, the second position being closer to the sink device 200 than the first position is.

In a state in which the source device 100 transmits data to the sink device 200 connected via the cable 300, the source device 100 can receive data sent from the cable 300 via the communication line 410. In this case, the data transmitted to the sink device 200 is prevented from being taken out as reception data.

The source device 100 has a controller (Ctrl.1) 101, a driver (Drv.1) 102, a driver (Drv.2) 103, a controller (Ctrl.2) 104, and a comparator (Comp.1) 105. The driver 102 is included in a data transmitting section, and the comparator 105 is included in a data receiving section.

The controller 101 sends, to the driver 102, transmission data to be transmitted to the sink device 200, and sends the transmission data also to the driver 103. Corresponding to the transmission data sent from the controller 101, the driver 102 generates a signal at a predetermined voltage level and outputs the signal to the communication line 410. Similarly to the driver 102, corresponding to the transmission data sent from the controller 101, the driver 103 generates a signal at a predetermined voltage level and supplies the signal to a negative input terminal of the comparator 105 as a cancellation signal.

The comparator 105 receives transmission data from the cable 300 sent via the communication line 410 and supplies the transmission data to the controller 104. A positive input terminal of the comparator 105 is connected with the communication line 410, and the negative input terminal of the comparator 105 is supplied with the output signal of the driver 103 as mentioned above. The comparator 105 outputs "0" when the signal level of the positive input terminal is lower than the signal level of the negative input terminal, and otherwise outputs "1."

In this case, when a signal corresponding to transmission data to the sink device 200 is output from the driver 102, the communication line 410 in this state carries a signal of the transmission data. However, as the cancellation signal from the driver 103, the negative input terminal of the comparator 105 is supplied with the signal similar to the signal output from the driver 102. Accordingly, the transmission data output from the controller 101 to the sink device 200 is not taken out as reception data at an output terminal of the comparator 105.

The cable 300 has a controller (Ctrl.3) 301, a driver (Drv.3) 302, a driver (Drv.4) 303, and a comparator (Comp.2) 304. The driver 302 is included in a data input section, and the comparator 304 is included in a data suppressing section.

The controller 301 sends, to the driver 302, transmission data to be transmitted to the source device 100, and sends the transmission data also to the driver 303. Corresponding to the transmission data sent from the controller 301, the driver 302 generates a signal at a predetermined voltage level and inputs the signal to the communication line 410 at the first position. Similarly to the driver 302, corresponding to the transmission data sent from the controller 301, the driver 303 generates a signal at a predetermined voltage level and supplies the signal to a negative input terminal of the comparator 304 as a cancellation signal.

The comparator 304 is provided at the second position on the communication line 410, the second position being closer to the sink device 200 than the first position mentioned above is, and prevents transmission data to the source device 100 output from the controller 301 from being sent to the sink device 200. A positive input terminal of the comparator 304 is connected to the communication line 410 extending toward the source device 100, and the negative input terminal of the comparator 304 is supplied with the output signal of the driver 303 as mentioned above. The comparator 304 is connected to the communication line 410 extending toward the sink device 200.

The comparator 304 outputs "0" when the signal level of the positive input terminal is lower than the signal level of the negative input terminal, and otherwise outputs "1." In this case, when a signal corresponding to transmission data to the source device 100 is output from the driver 302, the communication line 410 in this state carries a signal of the transmission data. However, as the cancellation signal from the driver 303, the negative input terminal of the comparator 304 is supplied with the signal similar to the signal output from the driver 302. Accordingly, a signal corresponding to transmission data output from the controller 301 to the source device 100 is not output to an output terminal of the comparator 304.

The sink device 200 has a controller (Ctrl.4) 201, and a driver (Drv.5) 202. The driver 202 is included in a data receiving section. On the basis of a signal sent from the source device 100 by being carried on the communication line 410, the driver 202 receives transmission data from the source device 100 and supplies the transmission data to the controller 201.

In the transfer system 10A illustrated in FIG. 1, the driver 102, the comparator 304, and the driver 202 are included in a circuit for transmitting data from the source device 100 to the sink device 200. Transmission data to the sink device 200 is supplied from the controller 101 of the source device 100 to the driver 102. The driver 102 generates a signal corresponding to the transmission data and outputs the signal to the communication line 410.

On the cable 300, the signal output to the communication line 410 in such a manner is obtained without any changes also on the communication line 410 on the output side of the comparator 304. Here, in a case that transmission data from the controller 301 to the source device 100 is output, a signal corresponding to the transmission data is input from the driver 302 to the communication line 410 at the first position. Accordingly, the communication line 410 in this state carries a summation signal of the signal corresponding to the transmission data from the source device 100 to the sink device 200 and the signal corresponding to the transmission data from the cable 300 to the source device 100.

However, as the cancellation signal from the driver 303, the negative input terminal of the comparator 304 is supplied with the signal similar to the signal output from the driver 302. Accordingly, the component of the signal corresponding to the transmission data from the cable 300 to the source device 100 is not output to the output terminal of the comparator 304, and the communication line 410 in this state carries only the signal corresponding to the transmission data from the source device 100 to the sink device 200.

Figure 2A:
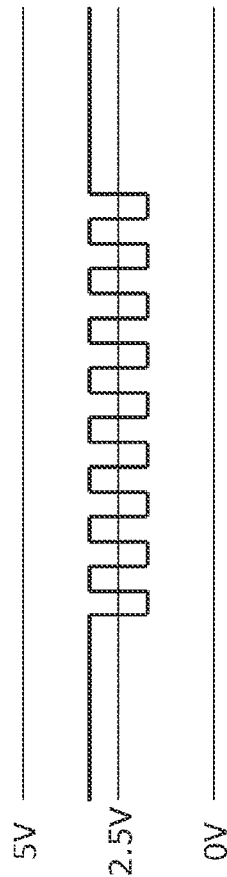
FIGS. 2A, 2B, and 2C depict figures illustrating one example of a signal corresponding to transmission data from a source device to a sink device, a signal corresponding to transmission data from a cable to the source device, and a summation signal of those signals.
Figure 2B:
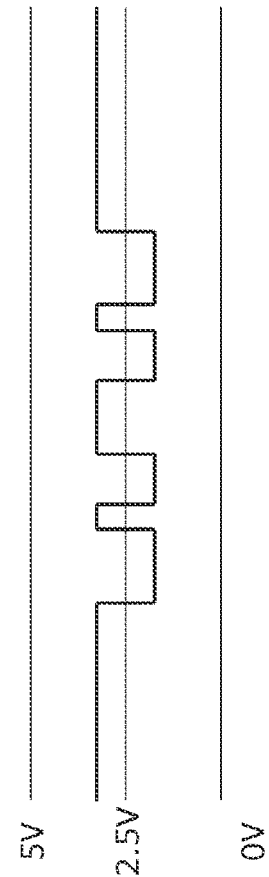
Figure 2C:
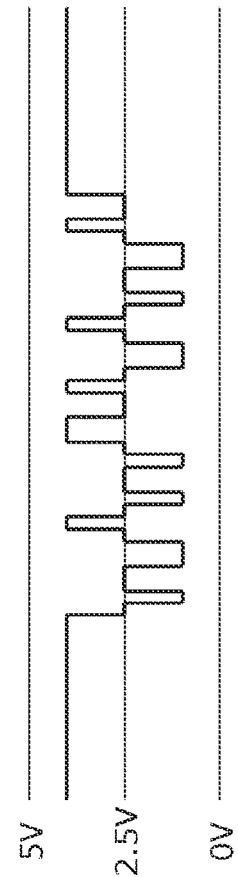

FIG. 2A illustrates one example of an output signal of the driver 102 of the source device 100. FIG. 2B illustrates one example of an output signal of the driver 302 of the cable 300. FIG. 2C illustrates one example of an output summation signal of the driver 102 and the driver 302.

FIG. 3A illustrates an input signal of the comparator 304 in that case. A solid line a illustrates an input signal at the positive input terminal (the same as the output summation signal of the driver 102 and the driver 302), and a broken line b illustrates an input signal as a threshold at the negative input terminal (the same as the output signal of the driver 302). FIG. 3B illustrates an output signal of the comparator 304. Even in a case that the output signal of the driver 302 is input to the communication line 410, the output signal of the comparator 304 is the same as the output signal of the driver 102 because the output signal of the driver 302 is cancelled.

At the sink device 200, the driver 202 is supplied from the communication line 410 with the signal corresponding to the transmission data from the source device 100 to the sink device 200. Accordingly, the driver 202 receives the transmission data from the source device 100, and the transmission data is supplied to the controller 201. In such a manner, data transmission from the source device 100 to the sink device 200 is performed.

In addition, in the transfer system 10A illustrated in FIG. 1, the driver 302 and the comparator 105 are included in a circuit for transmitting data from the cable 300 to the source device 100. Transmission data to the source device 100 is supplied from the controller 301 of the cable 300 to the driver 302. The driver 302 generates a signal corresponding to the transmission data and inputs the signal to the communication line 410 at the first position.

At the source device 100, the comparator 105 receives the transmission data from the cable 300 on the basis of the signal carried by the communication line 410 in such a manner, and the transmission data is supplied to the controller 104. Here, in a case that transmission data from the controller 101 to the sink device 200 is output, a signal corresponding to the transmission data is output from the driver 102 to the communication line 410. Accordingly, the communication line 410 in this state carries a summation signal of the signal corresponding to the transmission data from the cable 300 to the source device 100 and the signal corresponding to the transmission data from the source device 100 to the sink device 200.

However, as the cancellation signal from the driver 103, the negative input terminal of the comparator 105 is supplied with the signal similar to the signal output from the driver 102. Accordingly, the component of the signal corresponding to the transmission data from the source device 100 to the sink device 200 is not output to the output terminal of the comparator 105.

FIG. 4A illustrates an input signal of the comparator 105 in a case that an output signal of the driver 102 of the source device 100 is like the one illustrated in FIG. 2A, an output signal of the driver 302 of the cable 300 is like the one illustrated in FIG. 2B, and an output summation signal of the driver 102 and the driver 302 is like the one illustrated in FIG. 2C. Here, a solid line a illustrates an input signal at the positive input terminal (the same as the output summation signal of the driver 102 and the driver 302), and a broken line b illustrates an input signal as a threshold at the negative input terminal (the same as the output signal of the driver 102). FIG. 4B illustrates an output signal of the comparator 105. Even in a case that the output signal of the driver 102 is output to the communication line 410, the output signal of the comparator 105 is the same as the output signal of the driver 302 because the output signal of the driver 102 is cancelled.

In such a manner, in the transfer system 10A illustrated in FIG. 1, communication from the source device 100 to the sink device 200 and communication from the cable 300 to the source device 100 can individually be performed without time constraints. In addition, in the transfer system 10A illustrated in FIG. 1, the cancellation function of the comparator 304 prevents communication contents from the cable 300 to the source device 100 from being conveyed to the sink device 200. In this case, the cable 300 performs the conveyance prevention not by logically analyzing the signal contents, and parts costs for memories and the like, examination costs and the like are not necessary, thereby enabling cost reduction.

Note that, although the source device 100 includes the controller 101 and the controller 104 in the configuration of the transfer system 10A illustrated in FIG. 1, they may be included as one controller.

Second Embodiment

Figure 5:
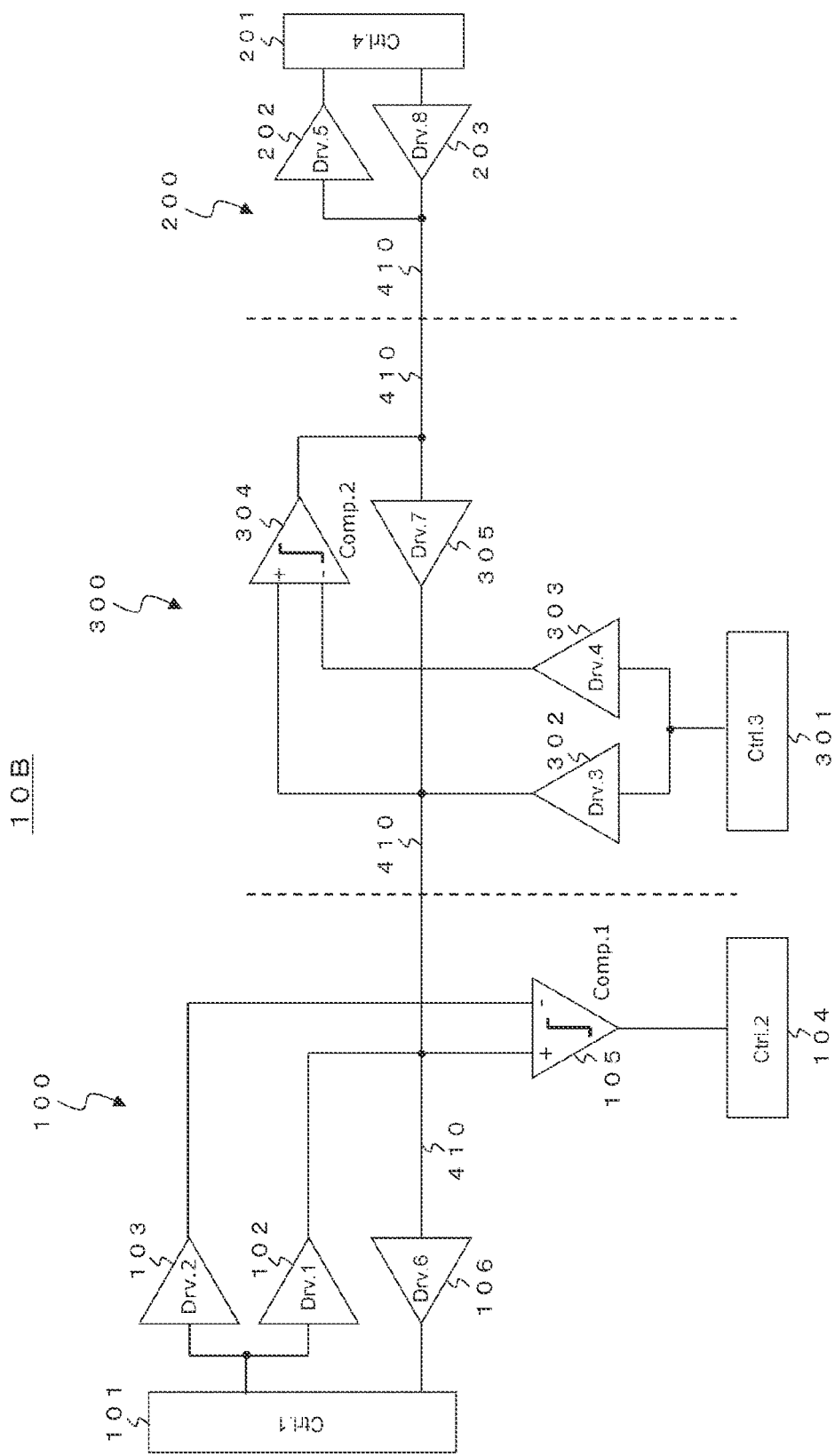
FIG. 5 is a figure illustrating a configuration example of a transfer system as a second embodiment.

FIG. 5 illustrates a configuration example of a transfer system 10B as a second embodiment. Portions in FIG. 5 that have counterparts in FIG. 1 are given identical reference signs, and detailed explanations thereof are omitted as appropriate. The transfer system 10B has the source device 100, the sink device 200, and the cable 300 connecting the source device 100 and the sink device 200.

In the transfer system 10B, half duplex bidirectional communication in which signals are temporally separated is enabled between the source device 100 and the sink device 200 by performing arbitration such that if a node makes a communication declaration, another node does not initiate transmission. In addition, in the transfer system 10B, full duplex communication is enabled in the segment between the source device 100 and the cable 300 in periods other than a period of communication from the sink device 200 to the source device 100. The transfer system 10B is configured such that, in this case, communication from the source device 100 to the sink device 200 and communication from the cable 300 to the source device 100 can individually be performed independently, and communication contents from the cable 300 to the source device 100 are not conveyed to the sink device 200.

In a state in which data is transmitted from the source device 100 to the sink device 200 via the communication line 410, the cable 300 can input first data at the first position on the communication line 410 and transmit the data to the source device 100. In this case, on the cable 300, a process for preventing the first data from being sent to the sink device 200 is performed at the second position on the communication line 410, the second position being closer to the sink device 200 than the first position is.

In a state in which the source device 100 transmits data to the sink device 200 connected via the cable 300, the source device 100 can receive data sent from the cable 300 via the communication line 410. In this case, the data transmitted to the sink device 200 is prevented from being taken out as reception data.

The source device 100 has the controller (Ctrl.1) 101, the driver (Drv.1) 102, the driver (Drv.2) 103, the controller (Ctrl.2) 104, the comparator (Comp.1) 105, and a driver (Drv.6) 106. The driver 102 is included in a data transmitting section, and the comparator 105 and the driver 106 are included in a data receiving section.

In a period of communication from the source device 100 to the sink device 200, the controller 101 sends, to the drivers 102 and 103, transmission data to be transmitted to the sink device 200. The driver 106 is provided in parallel with the drivers 102 and 103. On the basis of a signal sent from the sink device 200 by being carried on the communication line 410 in a period of communication from the sink device 200 to the source device 100, the driver 106 receives transmission data from the sink device 200 and supplies the transmission data to the controller 101.

In a period of communication from the source device 100 to the sink device 200, the comparator 105 receives transmission data from the cable 300 sent via the communication line 410. In other respects, the source device 100 is similar to the source device 100 of the transfer system 10A illustrated in FIG. 1, and so a detailed explanation thereof is omitted.

The cable 300 has the controller (Ctrl.3) 301, the driver (Drv.3) 302, the driver (Drv.4) 303, the comparator (Comp.2) 304, and a driver (Drv.7) 305. The driver 302 is included in a data input section, and the comparator 304 is included in a data suppressing section.

In a period of communication from the source device 100 to the sink device 200, the controller 301 sends, to the driver 302, transmission data to be transmitted to the source device 100. The driver 305 is inserted to the communication line 410 such that the driver 305 is connected in parallel with the comparator 304. In a period of communication from the sink device 200 to the source device 100, the driver 305 receives an input of a signal from the communication line 410 on the side of the sink device 200 and outputs a signal corresponding to the signal to the communication line 410 on the side of the source device 100. In other respects, the cable 300 is similar to the cable 300 of the transfer system 10A illustrated in FIG. 1, and so a detailed explanation thereof is omitted.

The sink device 200 has the controller (Ctrl.4) 201, the driver (Drv.5) 202, and a driver (Drv.8) 203. The driver 202 is included in a data receiving section, and the driver 203 is included in a data transmitting section.

The driver 203 is provided in parallel with the driver 202. In a period of communication from the sink device 200 to the source device 100, the controller 201 sends, to the driver 203, transmission data to be transmitted to the source device 100. Corresponding to the transmission data sent from the controller 201, the driver 203 generates a signal at a predetermined voltage level and outputs the signal to the communication line 410. On the basis of a signal sent from the source device 100 by being carried on the communication line 410 in a period of communication from the source device 100 to the sink device 200, the driver 202 receives transmission data from the source device 100 and supplies the transmission data to the controller 201. In other respects, the sink device 200 is similar to the sink device 200 of the transfer system 10A illustrated in FIG. 1, and so a detailed explanation thereof is omitted.

In the transfer system 10B illustrated in FIG. 5, the driver 102, the comparator 304, and the driver 202 are included in a circuit for transmitting data from the source device 100 to the sink device 200 in a period of communication from the source device 100 to the sink device 200. Although not explained in detail, communication operations (data transfer operations) by the circuit are similar to operations in the transfer system 10A illustrated in FIG. 1.

In addition, in the transfer system 10B illustrated in FIG. 5, the driver 302 and the comparator 105 are included in a circuit for transmitting data from the cable 300 to the source device 100 in a period of communication from the source device 100 to the sink device 200. Although not explained in detail, communication operations (data transfer operations) by the circuit are similar to operations in the transfer system 10A illustrated in FIG. 1.

In addition, in the transfer system 10B illustrated in FIG. 5, the driver 203, the driver 305, and the driver 106 are included in a circuit for transmitting data from the sink device 200 to the source device 100 in a period of communication from the sink device 200 to the source device 100. Transmission data to the source device 100 is supplied from the controller 201 of the sink device 200 to the driver 203. The driver 203 generates a signal corresponding to the transmission data and outputs the signal to the communication line 410.

On the cable 300, the signal output to the communication line 410 in such a manner is obtained without any changes also on the communication line 410 on the output side of the driver 305. At the source device 100, the driver 106 is supplied from the communication line 410 with the signal corresponding to the transmission data from the sink device 200 to the source device 100. Accordingly, the driver 106 receives the transmission data from the sink device 200, and the data is supplied to the controller 101. In such a manner, data transmission from the sink device 200 to the source device 100 is performed.

In such a manner, in the transfer system 10B illustrated in FIG. 5, half duplex bidirectional communication in which signals are temporally separated can be performed between the source device 100 and the sink device 200. In addition, in the transfer system 10B illustrated in FIG. 5, communication from the source device 100 to the sink device 200 and communication from the cable 300 to the source device 100 can individually be performed without time constraints in a period of communication from the source device 100 to the sink device 200 (full duplex communication).

Then, in this case, the cancellation function of the comparator 304 prevents communication contents from the cable 300 to the source device 100 from being conveyed to the sink device 200. In this case, the cable 300 performs the conveyance prevention not by logically analyzing the signal contents, and parts costs for memories and the like, examination costs and the like are not necessary, thereby enabling cost reduction.

Note that, although the source device 100 includes the controller 101 and the controller 104 in the configuration of the transfer system 10B illustrated in FIG. 5, they may be included as one controller.

Third Embodiment

Figure 6:
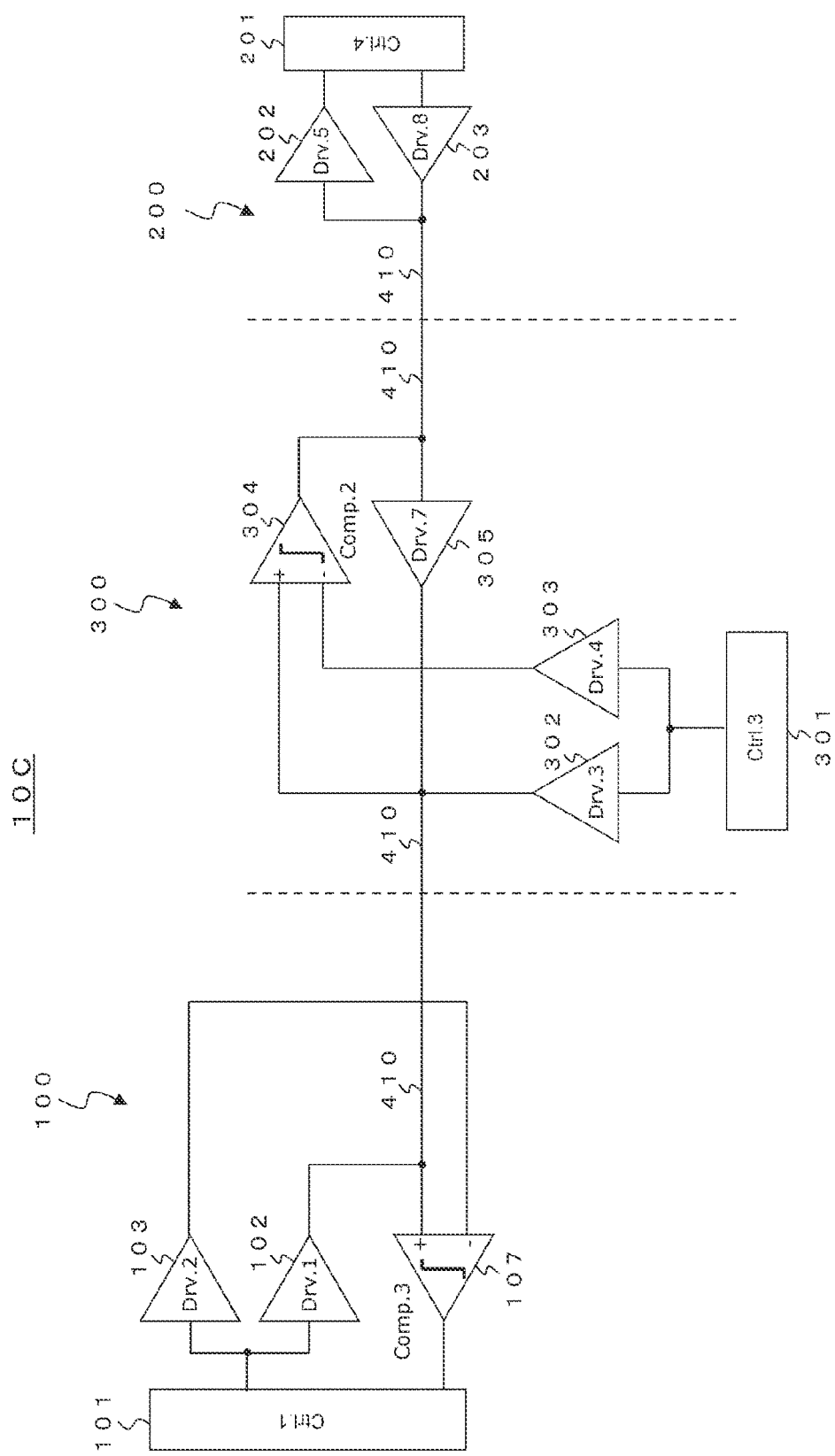
FIG. 6 is a figure illustrating a configuration example of a transfer system as a third embodiment.

FIG. 6 illustrates a configuration example of a transfer system 10C as a third embodiment. Portions in FIG. 6 that have counterparts in FIG. 5 are given identical reference signs, and detailed explanations thereof are omitted as appropriate. The transfer system 10C has the source device 100, the sink device 200, and the cable 300 connecting the source device 100 and the sink device 200.

In the example illustrated with the configuration of the transfer system 10B illustrated in FIG. 5, there are the comparator 105 that is a data receiving section for receiving transmission data from the cable 300 in a period of communication from the source device 100 to the sink device 200, and the driver 106 that is a data receiving section for receiving transmission data from the sink device 200 in a period of communication from the sink device 200 to the source device 100. At the source device 100 in the transfer system 10C, one data receiving section doubles as those two data receiving sections.

The source device 100 has the controller (Ctrl.1) 101, the driver (Drv.1) 102, the driver (Drv.2) 103, and a comparator (Comp.3) 107. The driver 102 is included in a data transmitting section, and the comparator 107 is included in a data receiving section.

The comparator 107 is provided in parallel with the drivers 102 and 103. In a period of communication from the source device 100 to the sink device 200, the comparator 107 receives transmission data from the cable 300 sent via the communication line 410 and supplies the transmission data to the controller 101. In addition, in a period of communication from the sink device 200 to the source device 100, the comparator 107 receives the transmission data from the sink device 200 sent via the communication line 410 and supplies the transmission data to the controller 101.

Here, because the controller 101 is in a half duplex communication system, the controller 101 recognizes whether the controller 101 is in a state in which data is transmitted from the source device 100 or in a state in which data is received from the sink device 200. Accordingly, the controller 101 can determine whether data received at the comparator 107 is transmission data from the sink device 200 or transmission data from the cable 300.

Here, a positive input terminal of the comparator 107 is connected with the communication line 410, and a negative input terminal of the comparator 107 is supplied with an output signal of the driver 103. The comparator 107 outputs "0" when the signal level of the positive input terminal is lower than the signal level of the negative input terminal, and otherwise outputs "1."

In this case, when a signal corresponding to transmission data to the sink device 200 is output from the driver 102, the communication line 410 in this state carries a signal of the transmission data. However, as the cancellation signal from the driver 103, the negative input terminal of the comparator 107 is supplied with the signal similar to the signal output from the driver 102. Accordingly, the transmission data output from the controller 101 to the sink device 200 is not taken out as reception data at an output terminal of the comparator 107.

Although not explained in detail, in other respects, the transfer system 10C illustrated in FIG. 6 is configured similarly to the transfer system 10B illustrated in FIG. 5. The transfer system 10C illustrated in FIG. 6 operates similarly to the transfer system 10B illustrated in FIG. 5 and can provide similar advantages.

Fourth Embodiment

Figure 7:
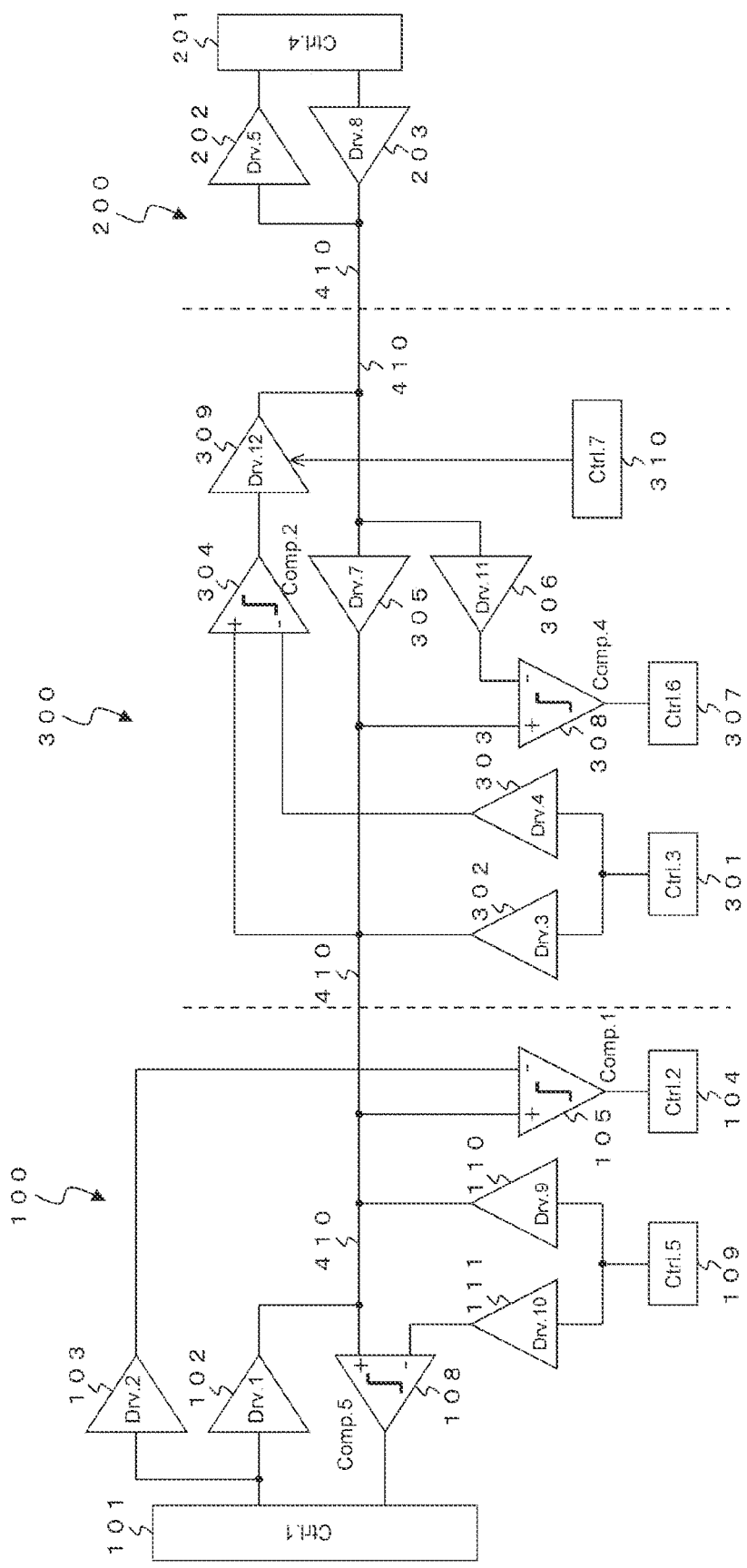
FIG. 7 is a figure illustrating a configuration example of a transfer system as a fourth embodiment.

FIG. 7 illustrates a configuration example of a transfer system 10D as a fourth embodiment. Portions in FIG. 7 that have counterparts in FIG. 5 are given identical reference signs, and detailed explanations thereof are omitted as appropriate. The transfer system 10D has the source device 100, the sink device 200, and the cable 300 connecting the source device 100 and the sink device 200.

In the transfer system 10D, half duplex bidirectional communication in which signals are temporally separated is enabled between the source device 100 and the sink device 200 by performing arbitration such that if a node makes a communication declaration, another node does not initiate transmission.

In addition, the transfer system 10D is configured such that communication from the source device 100 to the sink device 200 and communication from the cable 300 to the source device 100 can individually be performed independently, and communication contents from the cable 300 to the source device 100 are not conveyed to the sink device 200.

In addition, the transfer system 10D is configured such that communication from the sink device 200 to the source device 100 and communication from the source device 100 to the cable 300 can individually be performed independently, and communication contents from the source device 100 to the cable 300 are not conveyed to the sink device 200.

In a state in which data is transmitted from the source device 100 to the sink device 200 via the communication line 410, the cable 300 can input transmission data to the source device 100 at the first position on the communication line 410 and transmit the data to the source device 100. In this case, on the cable 300, a process for preventing the transmission data to the source device 100 from being sent to the sink device 200 is performed at the second position on the communication line 410, the second position being closer to the sink device 200 than the first position is.

In addition, in a state in which data is transmitted from the sink device 200 to the source device 100 via the communication line 410, the cable 300 can receive data sent from the source device 100 via the communication line 410. In this case, the data transmitted from the sink device 200 to the source device 100 is prevented from being taken out as reception data.

In addition, in a state in which data is transmitted from the sink device 200 to the source device 100 via the communication line 410, the source device 100 can input transmission data to the cable 300 at the first position on the communication line 410 and transmit the data to the cable 300. In this case, at the source device 100, the transmission data to the cable 300 is prevented from being taken out at a data receiving section that is located on the inner side of the communication line 410 relative to the first position and receives the transmission data from the sink device 200.

In addition, in a state in which the source device 100 transmits data to the sink device 200 connected via the cable 300, the source device 100 can receive data sent from the cable 300 via the communication line 410. In this case, the data transmitted to the sink device 200 is prevented from being taken out as reception data.

The source device 100 has the controller (Ctrl.1) 101, the driver (Drv.1) 102, the driver (Drv.2) 103, the controller (Ctrl.2) 104, the comparator (Comp.1) 105, a comparator (Comp.5) 108, a controller (Ctrl.5) 109, a driver (Drv.9) 110, and a driver (Drv.10) 111. Here, the driver 102 is included in a data transmitting section, the comparators 105 and 108 are included in a data receiving section, and the driver 110 is included in a data input section.

In a period of communication from the source device 100 to the sink device 200, the controller 101 sends, to the drivers 102 and 103, transmission data to be transmitted to the sink device 200. The comparator 108 is provided in parallel with the drivers 102 and 103. In a period of communication from the sink device 200 to the source device 100, the comparator 108 receives transmission data from the sink device 200 sent via the communication line 410.

Here, a positive input terminal of the comparator 108 is connected with the communication line 410, and a negative input terminal of the comparator 108 is supplied with an output signal of the driver 111. The comparator 108 outputs "0" when the signal level of the positive input terminal is lower than the signal level of the negative input terminal, and otherwise outputs "1."

In a period of communication from the sink device 200 to the source device 100, the controller 109 sends, to the driver 110, transmission data to be transmitted to the cable 300, and sends the transmission data also to the driver 111. Corresponding to the transmission data sent from the controller 109, the driver 110 generates a signal at a predetermined voltage level and inputs the signal to the communication line 410 at the first position. In this case, the driver 110 is included in a data input section.

Similarly to the driver 110, corresponding to the transmission data sent from the controller 109, the driver 111 generates a signal at a predetermined voltage level and supplies the signal to the negative input terminal of the comparator 108 as a cancellation signal. In other respects, the source device 100 is similar to the source device 100 of the transfer system 10B illustrated in FIG. 5, and so a detailed explanation thereof is omitted.

The cable 300 has the controller (Ctrl.3) 301, the driver (Drv.3) 302, the driver (Drv.4) 303, the comparator (Comp.2) 304, the driver (Drv.7) 305, a driver (Drv.11) 306, a controller (Ctrl.6) 307, a comparator (Comp.4) 308, a driver (Drv.12) 309, and a controller (Ctrl.7) 310. Here, the driver 302 is included in a data input section, the comparator 308 is included in a data receiving section, and the comparator 304 is included in a data suppressing section.

The driver 306 is provided in parallel with the driver 305. In a period of communication from the sink device 200 to the source device 100, similarly to the driver 305, the driver 306 receives an input of a signal from the communication line 410 on the side of the sink device 200, obtains a signal corresponding to the signal, and supplies the obtained signal to a negative input terminal of the comparator 308 as a cancellation signal.

In a period of communication from the sink device 200 to the source device 100, the comparator 308 receives transmission data from the source device 100 sent via the communication line 410 and supplies the transmission data to the controller 307. A positive input terminal of the comparator 308 is connected with the communication line 410, and the negative input terminal of the comparator 308 is supplied with the output signal of the driver 306 as mentioned above. The comparator 308 outputs "0" when the signal level of the positive input terminal is lower than the signal level of the negative input terminal, and otherwise outputs "1."

In this case, when a signal corresponding to transmission data to the source device 100 is output from the driver 305, the communication line 410 in this state carries a signal of the transmission data. However, as the cancellation signal from the driver 306, the negative input terminal of the comparator 308 is supplied with the signal similar to the signal output from the driver 305. Accordingly, the transmission data output from the controller 201 to the source device 100 is not taken out as reception data at an output terminal of the comparator 308.

The driver 309 is provided on the output side of the comparator 304. The driver 309 receives an input of an output signal of the comparator 304 and outputs a signal corresponding to the signal to the communication line 410 on the side of the sink device 200. Here, under the control of the controller 310, the driver 309 is enabled (enabled) in a period of communication from the source device 100 to the sink device 200, and disabled (disabled) in other periods. Thereby, transmission data from the source device 100 to the cable 300 is prevented from being sent to the sink device 200. In other respects, the cable 300 is similar to the cable 300 of the transfer system 10B illustrated in FIG. 5, and so a detailed explanation thereof is omitted.

The sink device 200 has the controller (Ctrl.4) 201, the driver (Drv.5) 202, and the driver (Drv.8) 203. The driver 202 is included in a data receiving section, and the driver 203 is included in a data transmitting section. Although not explained in detail, the sink device 200 is configured similarly to the sink device 200 of the transfer system 10B illustrated in FIG. 5.

In the transfer system 10D illustrated in FIG. 7, the driver 102, the comparator 304, the driver 309, and the driver 202 are included in a circuit for transmitting data from the source device 100 to the sink device 200 in a period of communication from the source device 100 to the sink device 200. Although not explained in detail, communication operations (data transfer operations) by the circuit are similar to operations in the transfer systems 10A and 10B illustrated in FIG. 1 and FIG. 5.

In addition, in the transfer system 10D illustrated in FIG. 7, the driver 302 and the comparator 105 are included in a circuit for transmitting data from the cable 300 to the source device 100 in a period of communication from the source device 100 to the sink device 200. Although not explained in detail, communication operations (data transfer operations) by the circuit are similar to operations in the transfer systems 10A and 10B illustrated in FIG. 1 and FIG. 5.

In addition, in the transfer system 10D illustrated in FIG. 7, the driver 203, the driver 305, and the driver 108 are included in a circuit for transmitting data from the sink device 200 to the source device 100 in a period of communication from the sink device 200 to the source device 100. Transmission data to the source device 100 is supplied from the controller 201 of the sink device 200 to the driver 203. The driver 203 generates a signal corresponding to the transmission data and outputs the signal to the communication line 410.

On the cable 300, the signal output to the communication line 410 in such a manner is obtained without any changes also on the communication line 410 on the output side of the driver 305. At the source device 100, the comparator 108 receives the transmission data from the sink device 200 on the basis of the signal obtained from the communication line 410 in such a manner, and the transmission data is supplied to the controller 101.

Here, in a case that transmission data from the controller 109 to the cable 300 is output, a signal corresponding to the transmission data is output from the driver 110 to the communication line 410. Accordingly, the communication line 410 in this state carries a summation signal of the signal corresponding to the transmission data from the sink device 200 to the source device 100 and the signal corresponding to the transmission data from the source device 100 to the cable 300.

However, as the cancellation signal from the driver 111, the negative input terminal of the comparator 108 is supplied with the signal similar to the signal output from the driver 110. Accordingly, the component of the signal corresponding to the transmission data from the source device 100 to the cable 300 is not output to the output terminal of the comparator 108.

In addition, in the transfer system 10D illustrated in FIG. 7, in a period of communication from the sink device 200 to the source device 100, the driver 110 and the comparator 308 are included in a circuit for transmitting data from the source device 100 to the cable 300. Transmission data to the cable 300 is supplied from the controller 109 of the source device 100 to the driver 110. The driver 110 generates a signal corresponding to the transmission data and inputs the signal to the communication line 410 at the first position.

On the cable 300, the comparator 308 receives the transmission data from the source device 100 on the basis of the signal carried by the communication line 410 in such a manner, and the transmission data is supplied to the controller 307. In this case, the signal output from the source device 100 to the communication line 410 is obtained also on the output side of the comparator 304. However, because the driver 309 is kept disabled in a period of communication from the sink device 200 to the source device 100, the signal is not output to the communication line 410 on the side of the sink device 200. Thereby, transmission data from the source device 100 to the cable 300 is prevented from being sent to the sink device 200.

In such a manner, in the transfer system 10D illustrated in FIG. 7, half duplex bidirectional communication in which signals are temporally separated can be performed between the source device 100 and the sink device 200. In addition, in the transfer system 10D illustrated in FIG. 7, communication from the source device 100 to the sink device 200 and communication from the cable 300 to the source device 100 can individually be performed without time constraints in a period of communication from the source device 100 to the sink device 200 (full duplex communication).

Then, in this case, the cancellation function of the comparator 304 prevents communication contents from the cable 300 to the source device 100 from being conveyed to the sink device 200. In this case, the cable 300 performs the conveyance prevention not by logically analyzing the signal contents, and parts costs for memories and the like, examination costs and the like are not necessary, thereby enabling cost reduction.

In addition, in the transfer system 10D illustrated in FIG. 7, communication from the sink device 200 to the source device 100 and communication from the source device 100 to the cable 300 can individually be performed without time constraints in a period of communication from the sink device 200 to the source device 100 (full duplex communication).

Then, because the driver 309 becomes disabled in this case, communication contents from the source device 100 to the cable 300 are prevented from being conveyed to the sink device 200. In this case, the cable 300 performs the conveyance prevention not by logically analyzing the signal contents, and parts costs for memories and the like, examination costs and the like are not necessary, thereby enabling cost reduction.

Note that, although the source device 100 includes the controllers 101, 104, and 109 in the configuration of the transfer system 10D illustrated in FIG. 7, they may be included as one controller. In addition, similarly, although the cable 300 includes the controllers 301, 307, and 310 in the configuration of the transfer system 10D illustrated in FIG. 7, they may be included as one controller.

Fifth Embodiment

Although not mentioned above, in the transfer systems 10B, 10C, and 10D illustrated in FIG. 5, FIG. 6, and FIG. 7 mentioned above, the cable 300 needs to determine whether the transfer systems 10B, 10C, and 10D are in a period of communication from the source device 100 to the sink device 200 or in a period of communication from the sink device 200 to the source device 100.

The first reason is because the cable 300 can send data to the source device 100 in a period of communication from the source device 100 to the sink device 200 as mentioned above, but the cable 300 needs to know a timing therefor. The second reason is because data is sent from the source device 100 to the cable 300 in a period of communication from the sink device 200 to the source device 100 in the transfer system 10D illustrated in FIG. 7 as mentioned above, but the cable 300 needs to know a timing to disable the driver 309 in order to inhibit the data from being transferred to the sink device 200 through the comparator 304.

Figure 8:
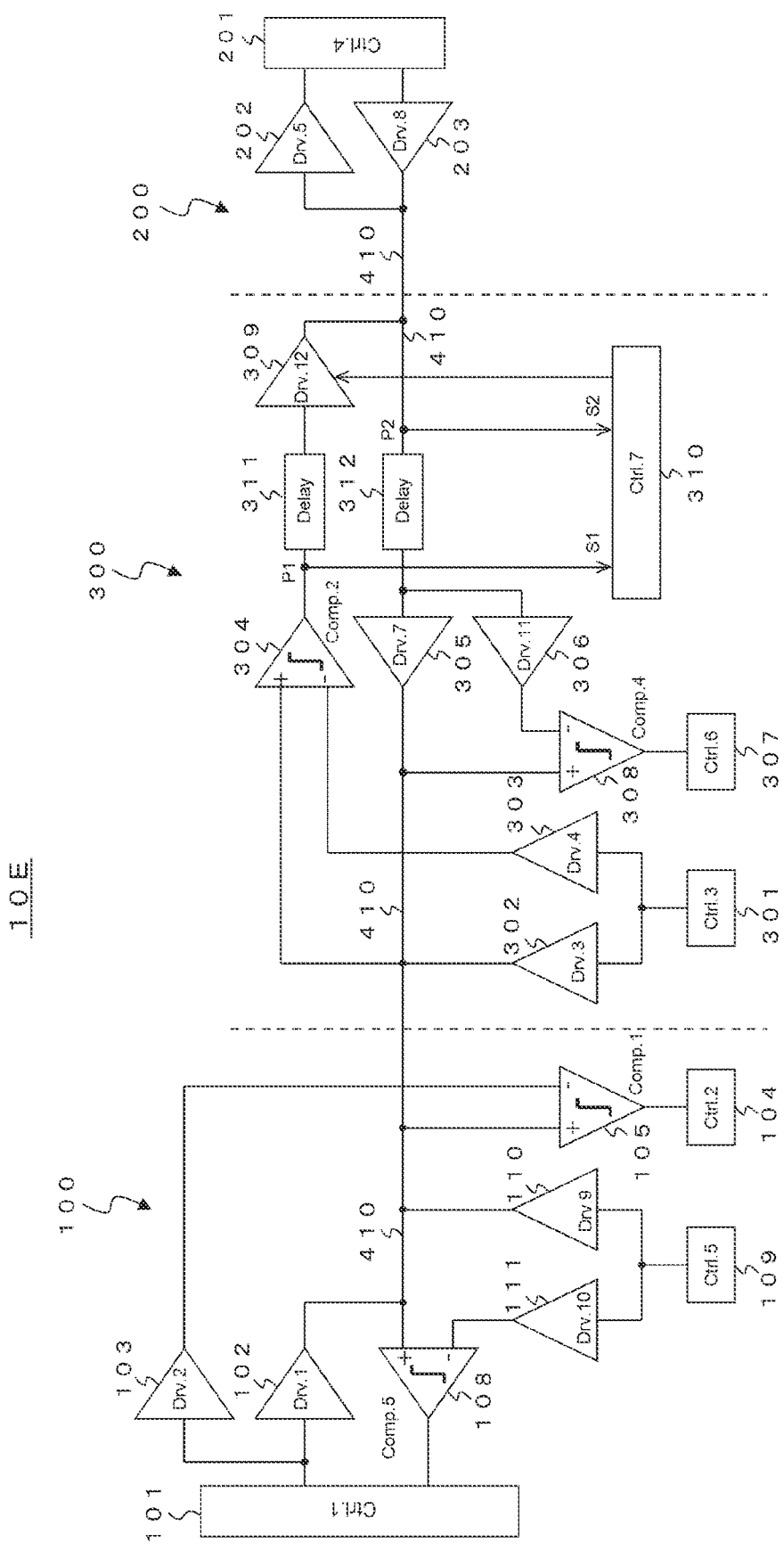
FIG. 8 is a figure illustrating a configuration example of a transfer system as a fifth embodiment.

FIG. 8 illustrates a configuration example of a transfer system 10E as a fifth embodiment. Portions in FIG. 8 that have counterparts in FIG. 7 are given identical reference signs, and detailed explanations thereof are omitted as appropriate. The transfer system 10E has the source device 100, the sink device 200, and the cable 300 connecting the source device 100 and the sink device 200. In the configuration of the transfer system 10E, on the basis of a timing difference between data transitions at the times of signal transfers, the cable 300 determines whether the transfer system 10E is in a period of communication from the source device 100 to the sink device 200 or in a period of communication from the sink device 200 to the source device 100.

The cable 300 further has delay circuits 311 and 312 having delay time of approximately ½ clocks, for example. The delay circuit 311 is inserted between the comparator 304 and the driver 309, and the delay circuit 312 is inserted on the input side of the driver 305. Then, the controller 310 is supplied with a signal S1 obtained at a point P1 on the output side of the comparator 304 and is supplied with a signal S2 obtained at a point P2 on the input side of the delay circuit 312.

In this case, at the time of a data transfer from the source device 100 to the sink device 200 in a period of communication from the source device 100 to the sink device 200, as illustrated in FIG. 9A, the data transition of the signal S1 is earlier than the data transition of the signal S2 due to the presence of the delay circuit 311. Accordingly, the cable 300 (controller 310) determines that the transfer system 10E is in a period of communication from the source device 100 to the sink device 200 and enables a data transfer from the cable 300 to the source device 100.

On the other hand, at the time of a data transfer from the sink device 200 to the source device 100 in a period of communication from the sink device 200 to the source device 100, as illustrated in FIG. 9B, the data transition of the signal S2 is earlier than the data transition of the signal S1 due to the presence of the delay circuit 312. Accordingly, the controller 310 (cable 300) determines that the transfer system 10E is in a period of communication from the sink device 200 to the source device 100, disables the driver 309, and determines output data of the comparator 308 as transfer data from the source device 100 to the cable 300. Here, a reason why the data transition of the signal S1 occurs at the time of a data transfer from the sink device 200 to the source device 100 is because an output signal of the driver 305 is input also to the positive input terminal of the comparator 304 in this configuration.

Figure 10:
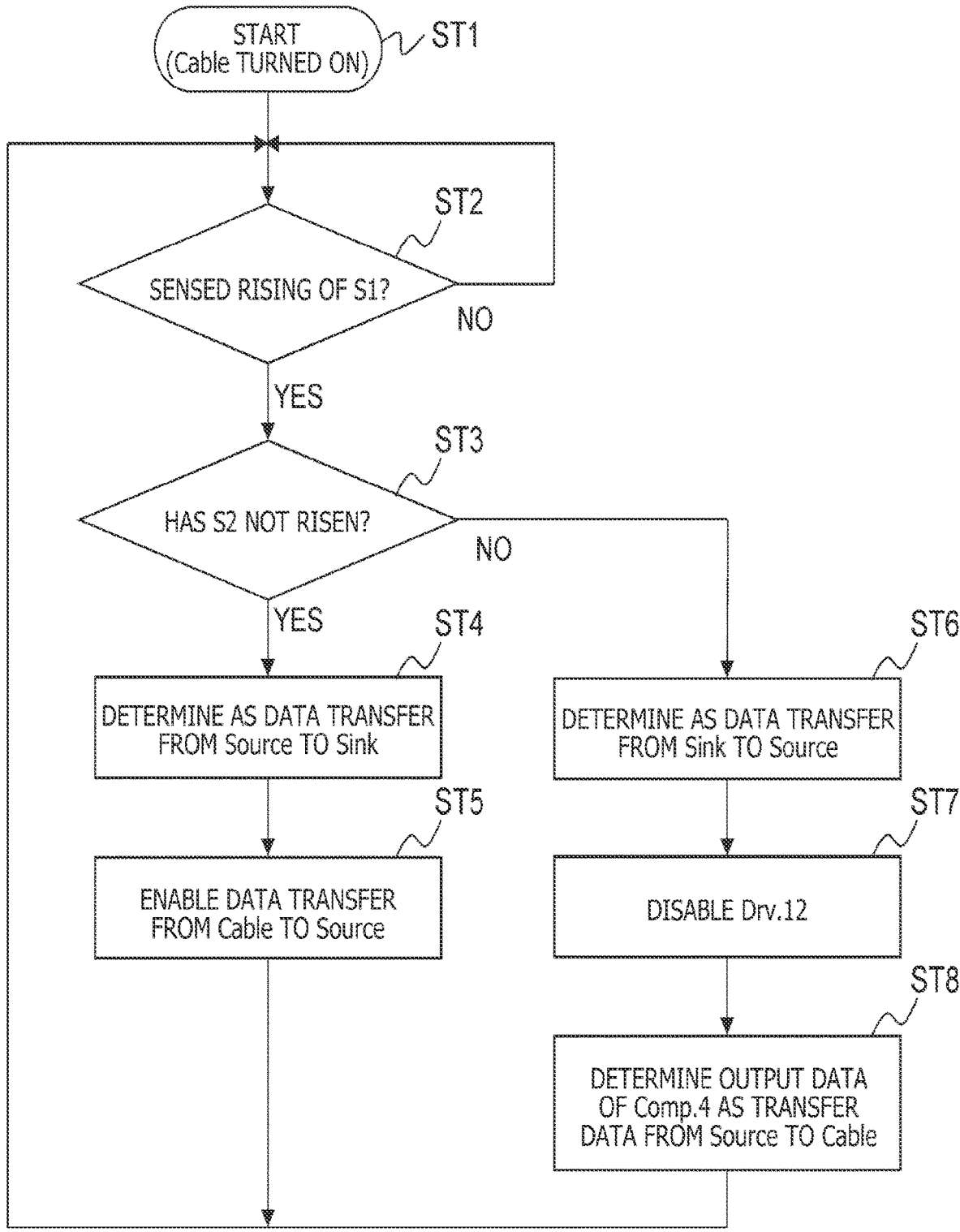
FIG. 10 is a flowchart illustrating one example of a procedure of a process of determining a data transfer direction in the cable.

The flowchart illustrated in FIG. 10 illustrates one example of a procedure of a determination process on the cable 300 (controller 310). In Step ST1, the cable 300 starts the determination process at the timing of activation of a power supply. Next, in Step ST2, the cable 300 determines whether or not the rising of the signal S1 has been detected. When the rising of the signal S1 has been detected, in Step ST3, the cable 300 determines whether or not the signal S2 has not risen, that is, whether or not the signal S2 is "0."

When the signal S2 has not risen (see FIG. 9A), in Step ST4, the cable 300 determines a data transfer from the source device 100 to the sink device 200 is being performed. Then, in Step ST5, the cable 300 enables a data transfer from the cable 300 to the source device 100. Thereafter, although an illustration thereof is omitted, for example, after the cable 300 detects an end condition of data from the source device 100 to the sink device 200 or after an elapse of a certain length of time including predetermined data transfer time if such data transfer time is predetermined regarding a data transfer from the source device 100 to the sink device 200, the process returns to Step ST2.

In addition, when the signal S2 has risen before Step ST3 (see FIG. 9B), in Step ST6, the cable 300 determines that a data transfer from the sink device 200 to the source device 100 is being performed. Next, in Step ST7, the cable 300 disables the driver 309 and determines output data of the comparator 308 as transfer data from the source device 100 to the cable 300 in Step ST8. Thereafter, although an illustration thereof is omitted, for example, after the cable 300 detects an end condition of data from the sink device 200 to the source device 100 or after an elapse of a certain length of time including data transfer time if such data transfer time is predetermined regarding a data transfer from the sink device 200 to the source device 100, the process returns to Step ST2.

Note that, although attention is paid to rising as data transition portions in the example illustrated with the flowchart illustrated in FIG. 10 mentioned above, attention may be paid to falling as data transition portions.

Although not explained in detail, in other respects, the transfer system 10E illustrated in FIG. 8 is configured similarly to the transfer system 10D illustrated in FIG. 7. The transfer system 10E illustrated in FIG. 8 operates similarly to the transfer system 10D illustrated in FIG. 7 and can provide similar advantages.

Sixth Embodiment

Figure 11:
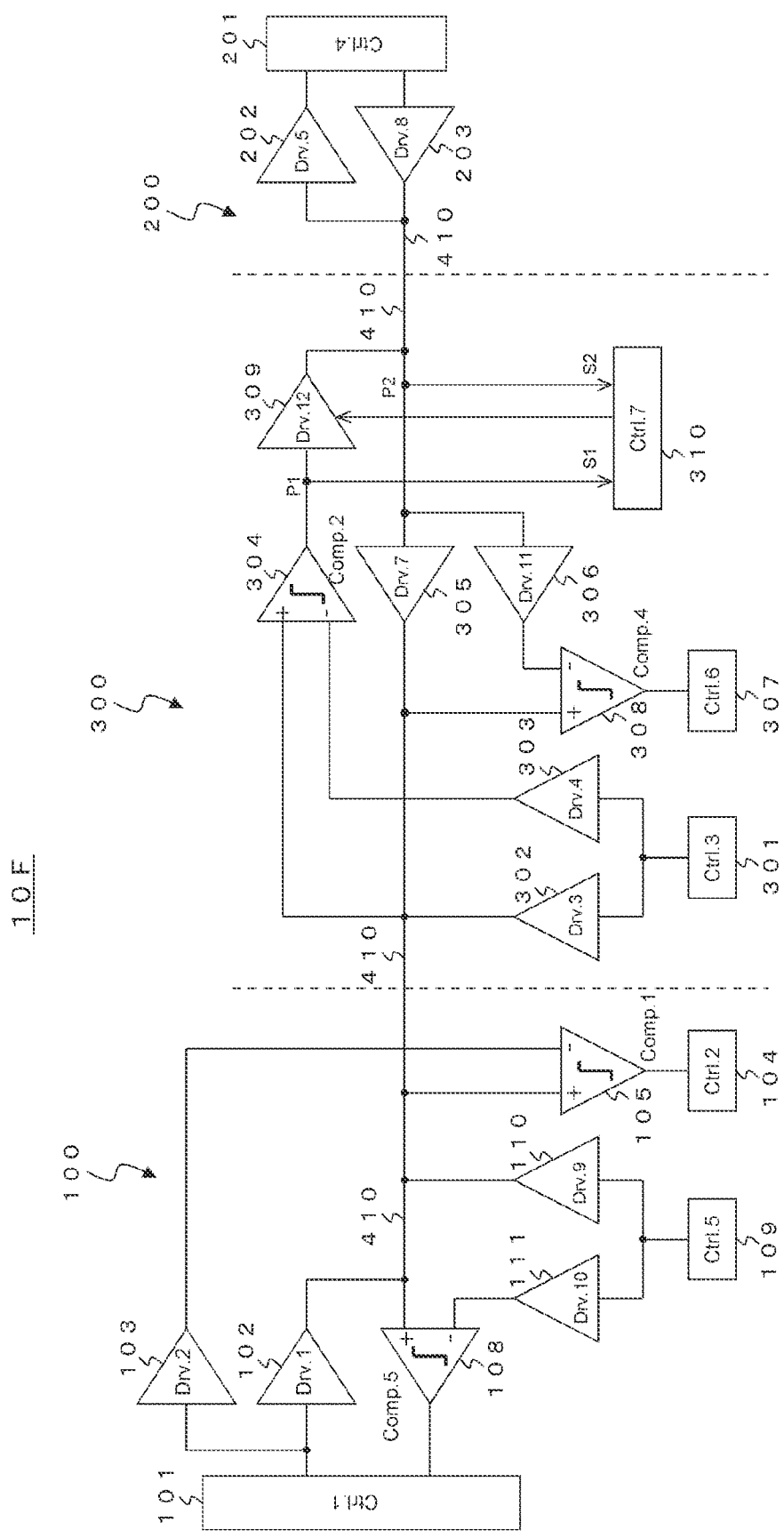
FIG. 11 is a figure illustrating a configuration example of a transfer system as a sixth embodiment.

FIG. 11 illustrates a configuration example of a transfer system 10F as a sixth embodiment. Portions in FIG. 11 that have counterparts in FIG. 7 are given identical reference signs, and detailed explanations thereof are omitted as appropriate. The transfer system 10F has the source device 100, the sink device 200, and the cable 300 connecting the source device 100 and the sink device 200.

Figure 12:
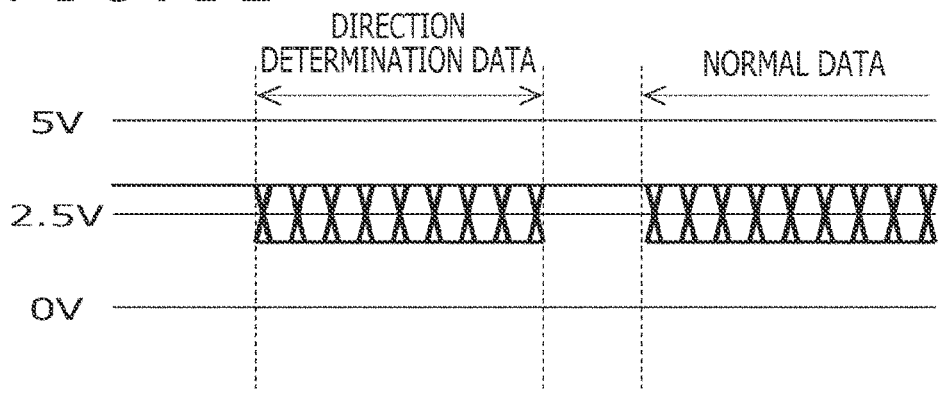
FIG. 12 is a figure illustrating that direction determination data is arranged before data to be exchanged between the source device and the sink device (normal data).

In the configuration of the transfer system 10F, on the basis of direction determination data at the time of a signal transfer, the cable 300 determines whether the transfer system 10F is in a period of communication from the source device 100 to the sink device 200 or in a period of communication from the sink device 200 to the source device 100. In this case, for example, as illustrated in FIG. 12, the direction determination data is arranged before data exchanged between the source device 100 and the sink device 200 (normal data).

On the cable 300, the controller 310 is supplied with the signal S1 obtained at a point P1 on the output side of the comparator 304 and is supplied with the signal S2 obtained at a point P2 on the input side of the driver 305.

In this case, at the time of a data transfer from the source device 100 to the sink device 200 in a period of communication from the source device 100 to the sink device 200, the cable 300 (controller 310) determines that the transfer system 10F is in a period of communication from the source device 100 to the sink device 200 on the basis of direction determination data included in the signal S1 and enables a data transfer from the cable 300 to the source device 100.

On the other hand, at the time of a data transfer from the sink device 200 to the source device 100 in a period of communication from the sink device 200 to the source device 100, the cable 300 (controller 310) determines that the transfer system 10F is in a period of communication from the sink device 200 to the source device 100 on the basis of direction determination data included in the signal S2, disables the driver 309, and determines output data of the comparator 308 as transfer data from the source device 100 to the cable 300.

Figure 13:
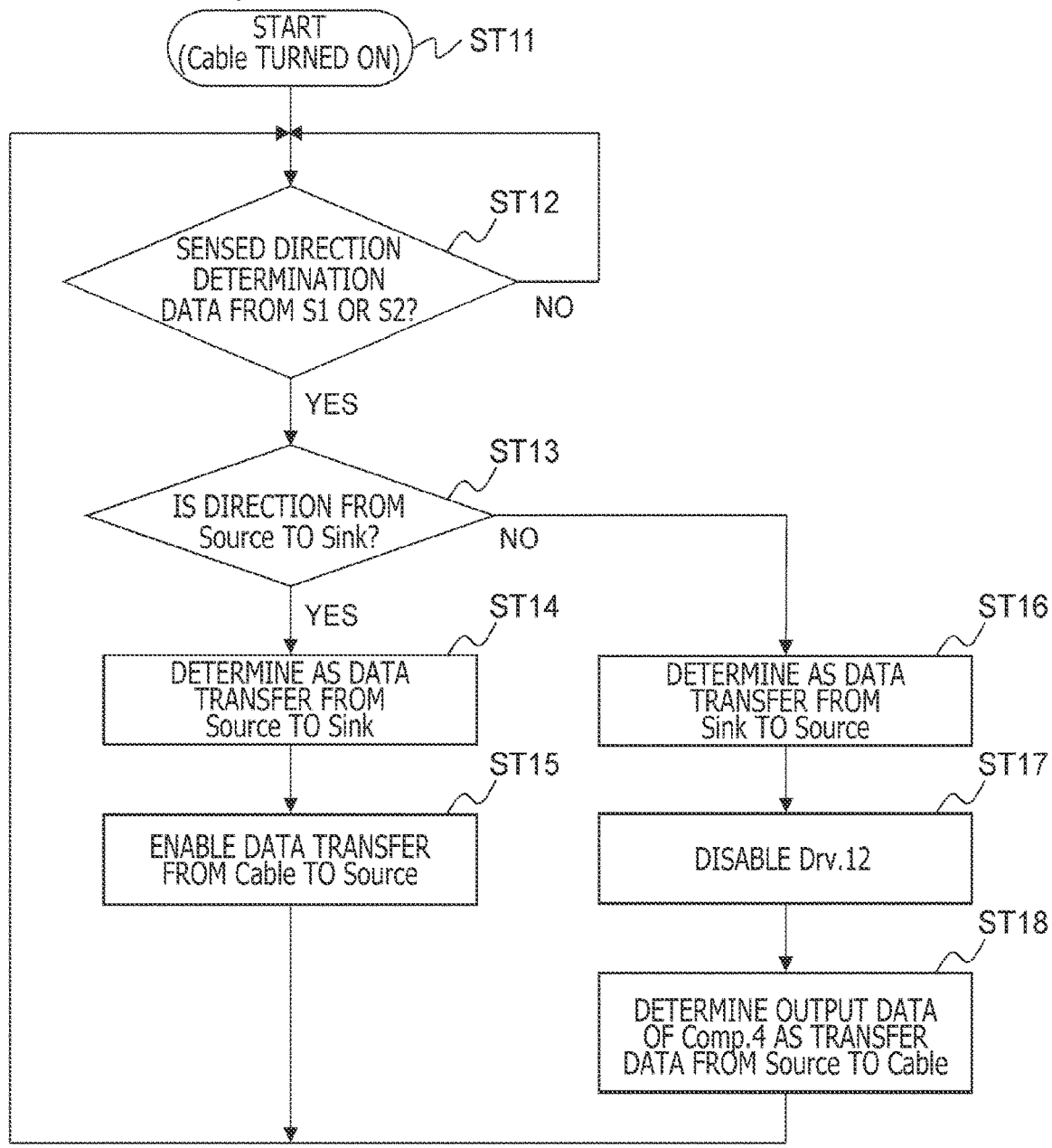
FIG. 13 is a flowchart illustrating another example of the procedure of the process of determining the data transfer direction in the cable.

The flowchart illustrated in FIG. 13 illustrates one example of a procedure of a determination process on the cable 300 (controller 310). In Step ST11, the cable 300 starts the determination process at the timing of activation of a power supply. Next, in Step ST12, the cable 300 determines whether or not direction determination data has been detected in the signal S1 or the signal S2. When direction determination data has been detected, in Step ST13, the cable 300 determines whether or not the direction is from the source device 100 to the sink device 200.

When the direction is from the source device 100 to the sink device 200, in Step ST14, the cable 300 determines a data transfer from the source device 100 to the sink device 200 is being performed. Then, in Step ST15, the cable 300 enables a data transfer from the cable 300 to the source device 100. Thereafter, although an illustration thereof is omitted, for example, after the cable 300 detects an end condition of data from the source device 100 to the sink device 200 or after an elapse of a certain length of time including data transfer time if such data transfer time is predetermined regarding a data transfer from the source device 100 to the sink device 200, the process returns to Step ST2.

In addition, when the direction is from the sink device 200 to the source device 100 in Step ST13, the cable 300 determines that a data transfer from the sink device 200 to the source device 100 is being performed in Step ST16. Next, in Step ST17, the cable 300 disables the driver 309 and determines output data of the comparator 308 as transfer data from the source device 100 to the cable 300 in Step ST18. Thereafter, although an illustration thereof is omitted, for example, after the cable 300 detects an end condition of data from the sink device 200 to the source device 100 or after an elapse of a certain length of time including data transfer time if such data transfer time is predetermined regarding a data transfer from the sink device 200 to the source device 100, the process returns to Step ST2.

Although not explained in detail, in other respects, the transfer system 10F illustrated in FIG. 11 is configured similarly to the transfer system 10D illustrated in FIG. 7. The transfer system 10F illustrated in FIG. 11 operates similarly to the transfer system 10D illustrated in FIG. 7 and can provide similar advantages.

Seventh Embodiment

Figure 14:
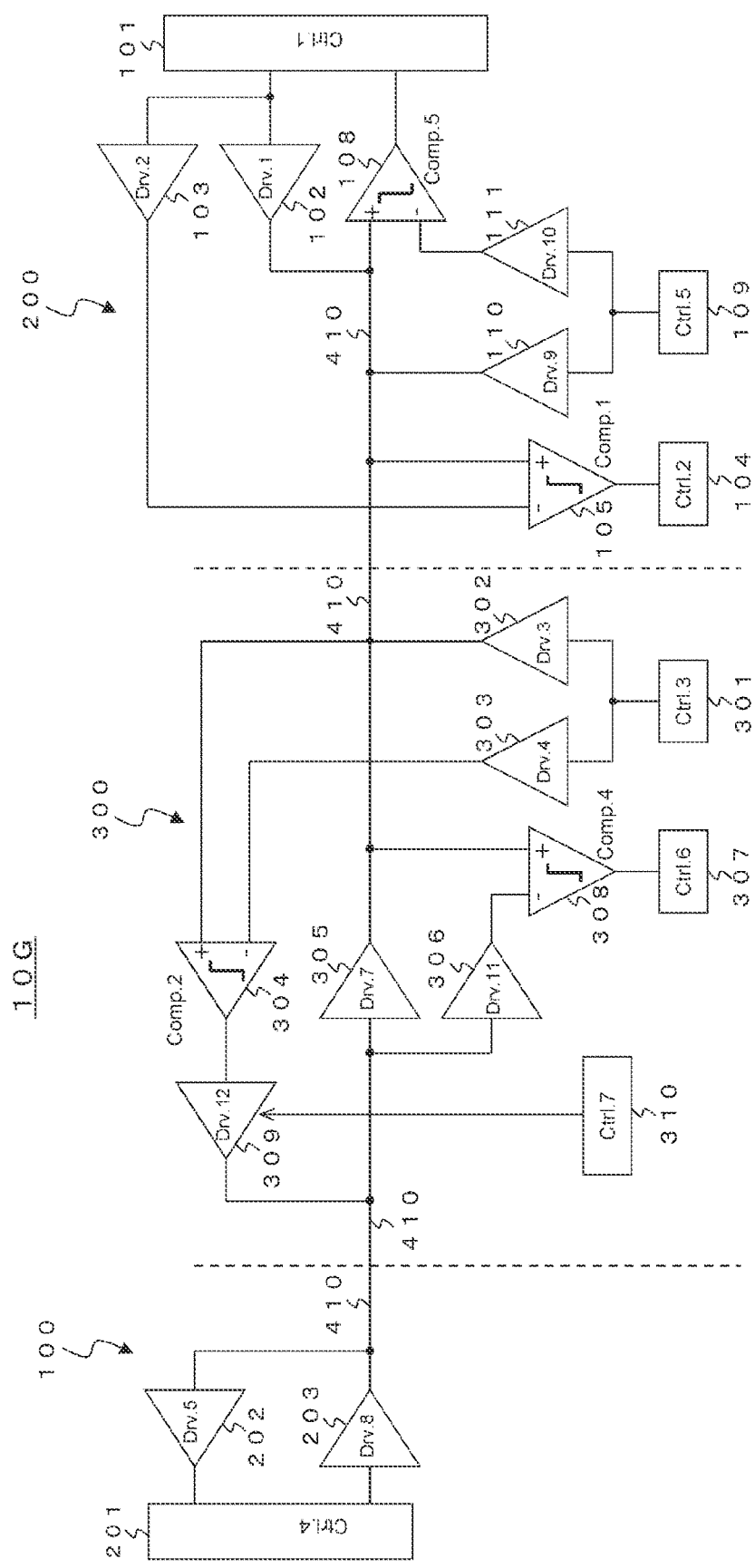
FIG. 14 is a figure illustrating a configuration example of a transfer system as a seventh embodiment.

FIG. 14 illustrates a configuration example of a transfer system 10G as a seventh embodiment. Portions in FIG. 14 that have counterparts in FIG. 7 are given identical reference signs, and detailed explanations thereof are omitted as appropriate. The transfer system 10G has the source device 100, the sink device 200, and the cable 300 connecting the source device 100 and the sink device 200.

In the transfer system 10G, half duplex bidirectional communication in which signals are temporally separated is enabled between the source device 100 and the sink device 200 by performing arbitration such that if a node makes a communication declaration, another node does not initiate transmission.

In addition, in the transfer system 10G, full duplex communication is enabled in a segment between the sink device 200 and the cable 300 in a period of communication from the sink device 200 to the source device 100. The transfer system 10G is configured such that, in this case, communication from the sink device 200 to the source device 100 and communication from the cable 300 to the sink device 200 can individually be performed independently, and communication contents from the cable 300 to the sink device 200 are not conveyed to the source device 100.

In addition, the transfer system 10G is configured such that communication from the source device 100 to the sink device 200 and communication from the sink device 200 to the cable 300 can individually be performed independently, and communication contents from the sink device 200 to the cable 300 are not conveyed to the source device 100.

The sink device 200 has the controller (Ctrl.1) 101, the driver (Drv.1) 102, the driver (Drv.2) 103, the controller (Ctrl.2) 104, the comparator (Comp.1) 105, the comparator (Comp.5) 108, the controller (Ctrl.5) 109, the driver (Drv.9) 110, and the driver (Drv.10) 111. Although not explained in detail, this is similar to the configuration of the source device 100 in the transfer system 10D illustrated in FIG. 7.

The cable 300 has the controller (Ctrl.3) 301, the driver (Drv.3) 302, the driver (Drv.4) 303, the comparator (Comp.2) 304, the driver (Drv.7) 305, the driver (Drv.11) 306, the controller (Ctrl.6) 307, the comparator (Comp.4) 308, the driver (Drv.12) 309, and the controller (Ctrl.7) 310. Although not explained in detail, this is similar to the configuration of the cable 300 in the transfer system 10D illustrated in FIG. 7.

The source device 100 has the controller (Ctrl.4) 201, the driver (Drv.5) 202, and the driver (Drv.8) 203. Although not explained in detail, this is similar to the configuration of the sink device 200 in the transfer system 10D illustrated in FIG. 7.

Although not explained in detail, communication operations between the sink device 200 and the source device 100 in the transfer system 10G illustrated in FIG. 14 are similar to communication operations between the source device 100 and the sink device 200 in the transfer system 10D illustrated in FIG. 7. In addition, although not explained in detail, communication operations between the sink device 200 and the cable 300 in the transfer system 10G illustrated in FIG. 14 are similar to communication operations between the source device 100 and the cable 300 in the transfer system 10D illustrated in FIG. 7.

In such a manner, in the transfer system 10G illustrated in FIG. 14, half duplex bidirectional communication in which signals are temporally separated can be performed between the source device 100 and the sink device 200. In addition, in the transfer system 10G illustrated in FIG. 14, communication from the sink device 200 to the source device 100 and communication from the cable 300 to the sink device 200 can individually be performed without time constraints in a period of communication from the sink device 200 to the source device 100 (full duplex communication).

Then, in this case, the cancellation function of the comparator 304 prevents communication contents from the cable 300 to the sink device 200 from being conveyed to the source device 100. In this case, the cable 300 performs the conveyance prevention not by logically analyzing the signal contents, and parts costs for memories and the like, examination costs and the like are not necessary, thereby enabling cost reduction.

In addition, in the transfer system 10G illustrated in FIG. 14, communication from the source device 100 to the sink device 200 and communication from the sink device 200 to the cable 300 can individually be performed without time constraints in a period of communication from the source device 100 to the sink device 200 (full duplex communication).

Then, because the driver 309 becomes disabled in this case, communication contents from the sink device 200 to the cable 300 are prevented from being conveyed to the source device 100. In this case, the cable 300 performs the conveyance prevention not by logically analyzing the signal contents, and parts costs for memories and the like, examination costs and the like are not necessary, thereby enabling cost reduction.

Eighth Embodiment

Figure 15:
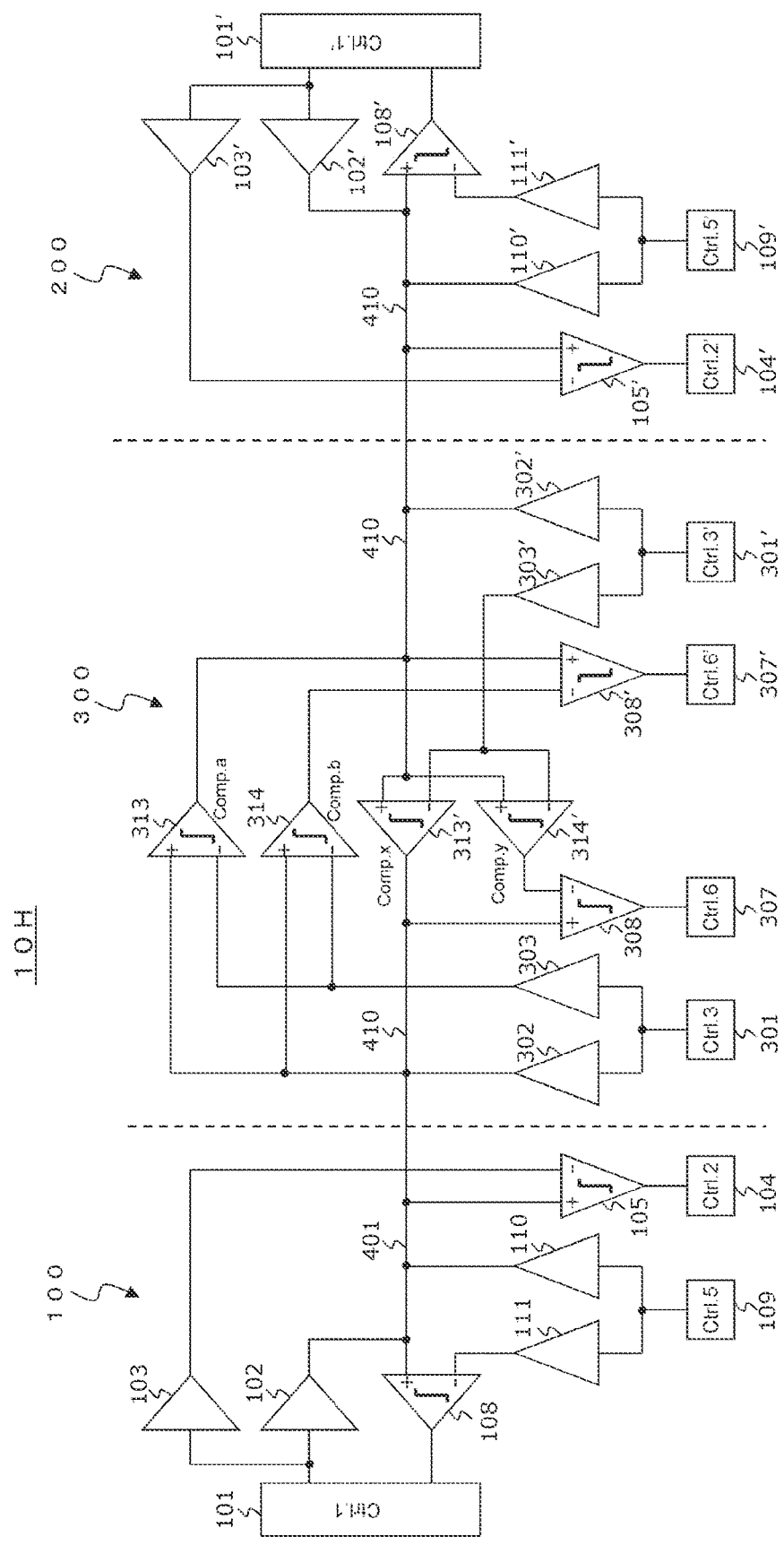
FIG. 15 is a figure illustrating a configuration example of a transfer system as an eighth embodiment.

FIG. 15 illustrates a configuration example of a transfer system 10H as an eighth embodiment. Portions in FIG. 15 that have counterparts in FIG. 7 are illustrated by being given identical reference signs or reference signs with dashes. The transfer system 10H has the source device 100, the sink device 200, and the cable 300 connecting the source device 100 and the sink device 200. Although not explained in detail, the transfer system 10H has a configuration equivalent to a combination of the transfer system 10D illustrated in FIG. 7 and the transfer system 10G illustrated in FIG. 14.

In the transfer system 10H, half duplex bidirectional communication in which signals are temporally separated is enabled between the source device 100 and the sink device 200 by performing arbitration such that if a node makes a communication declaration, another node does not initiate transmission.

In addition, the transfer system 10H is configured such that communication from the source device 100 to the sink device 200 and communication from the cable 300 to the source device 100 can individually be performed independently, and communication contents from the cable 300 to the source device 100 are not conveyed to the sink device 200.

In addition, the transfer system 10H is configured such that communication from the sink device 200 to the source device 100 and communication from the source device 100 to the cable 300 can individually be performed independently, and communication contents from the source device 100 to the cable 300 are not conveyed to the sink device 200.

In addition, the transfer system 10H is configured such that communication from the sink device 200 to the source device 100 and communication from the cable 300 to the sink device 200 can individually be performed independently, and communication contents from the cable 300 to the sink device 200 are not conveyed to the source device 100.

In addition, the transfer system 10H is configured such that communication from the source device 100 to the sink device 200 and communication from the sink device 200 to the cable 300 can individually be performed independently, and communication contents from the sink device 200 to the cable 300 are not conveyed to the source device 100.

Note that, in the transfer system 10H illustrated in FIG. 15, the circuit that determines whether the transfer system 10H is in a period of communication from the source device 100 to the sink device 200 or in a period of communication from the sink device 200 to the source device 100 is omitted on the cable 300. The cable 300 is configured such that, in a period of communication from the sink device 200 to the source device 100, a comparator (Copm.a) 313 and a comparator (Copm.b) 314 are disabled, and communication contents from the source device 100 to the cable 300 are not conveyed to the sink device 200. In addition, the cable 300 is configured such that, in a period of communication from the source device 100 to the sink device 200, a comparator (Copm.x) 313' and a comparator (Copm.y) 314' are disabled, and communication contents from the sink device 200 to the cable 300 are not conveyed to the source device 100.

Ninth Embodiment

Figure 16:
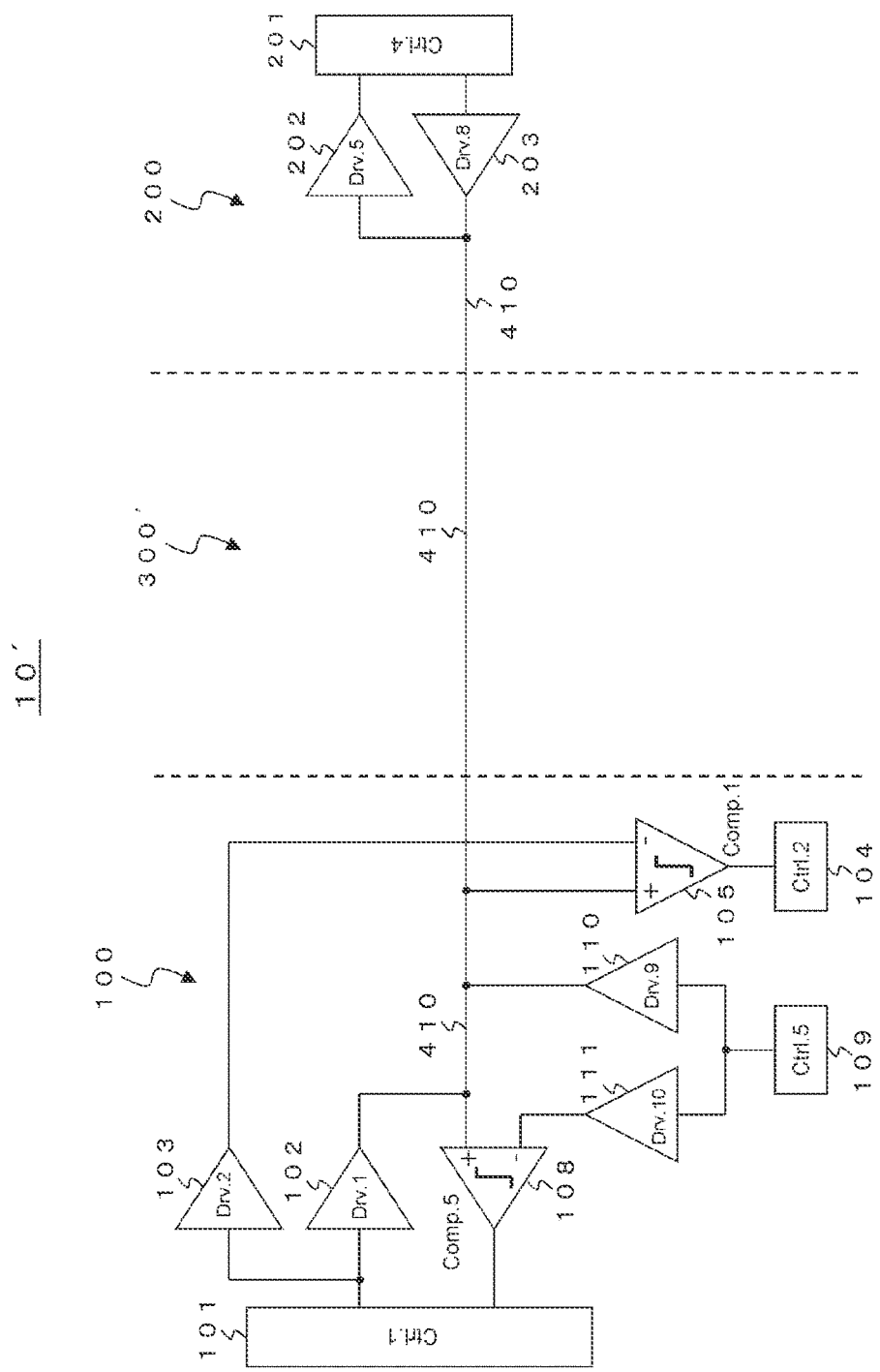
FIG. 16 is a figure illustrating a configuration example of the transfer system in a case that a legacy cable is connected.

The cable 300 corresponds to the present technique in each embodiment mentioned above. FIG. 16 illustrates a transfer system 10' in a case that a legacy cable 300' is connected. Portions in FIG. 16 that have counterparts in FIG. 7 are illustrated by being given identical reference signs. In the transfer system 10', the source device 100 and the sink device 200 are the same as the source device 100 and the sink device 200, respectively, in the transfer device 10D illustrated in FIG. 7.

In the case of the transfer system 10' illustrated in FIG. 16, when communication is performed between the source device 100 and the sink device 200, the source device 100 does not know whether the connected cable 300' is a compatible cable or an incompatible cable. Accordingly, there is a possibility that, in a period of communication from the sink device 200 to the source device 100, transmission data to be transmitted from the controller 109 to the cable 300 is supplied to the driver 110, the driver 110 outputs a signal corresponding to the transmission data to the communication line 410, the signal arrives at the sink device 200, and a malfunction occurs on the side of the sink device 200 due to the signal. Accordingly, it is desired that the source device 100 transmits a signal after determining whether the connected cable is a compatible cable or an incompatible cable.

Figure 17:
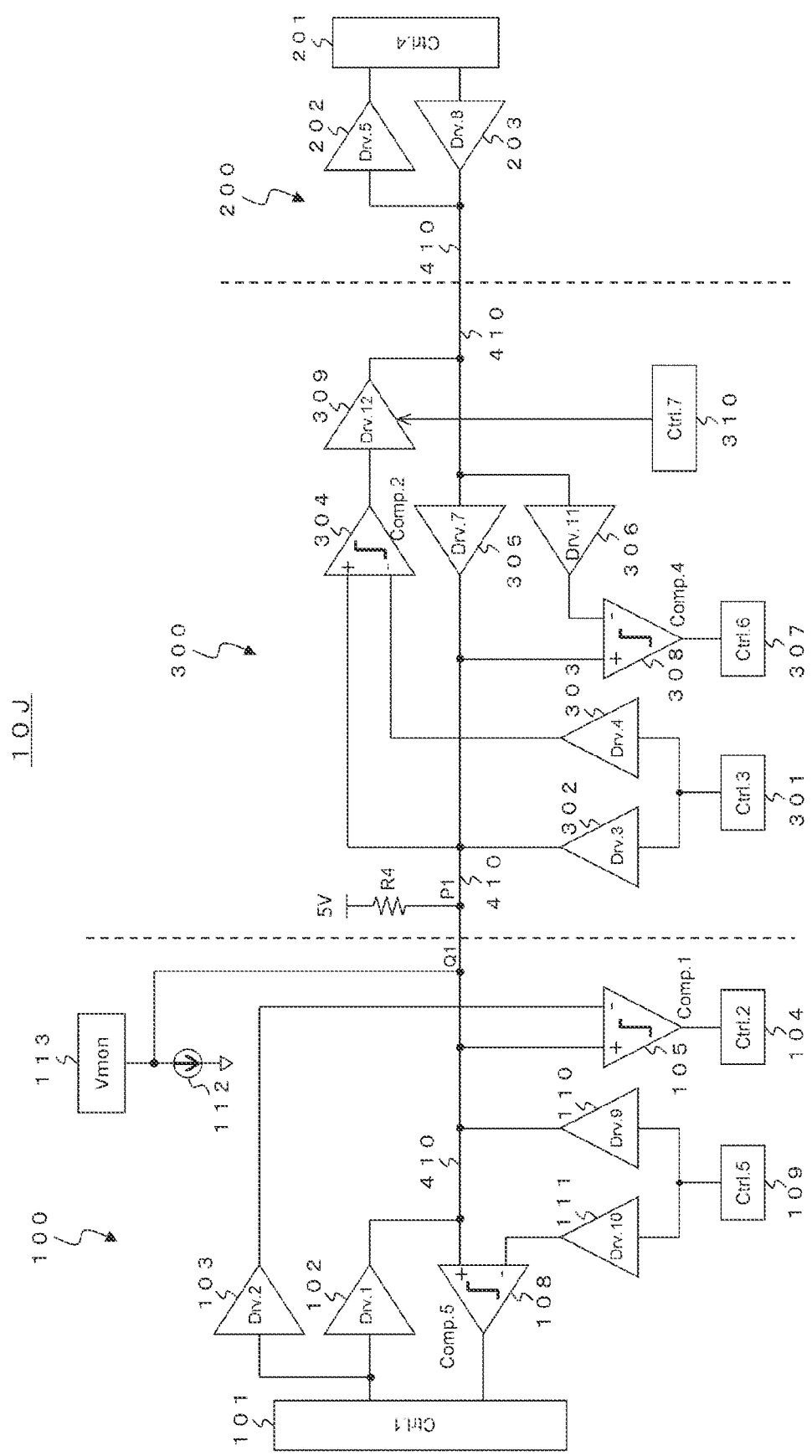
FIG. 17 is a figure illustrating a configuration example of a transfer system as a ninth embodiment.

FIG. 17 illustrates a configuration example of a transfer system 10J as a ninth embodiment. Portions in FIG. 17 that have counterparts in FIG. 7 are given identical reference signs, and detailed explanations thereof are omitted as appropriate.

On the cable 300, a pull-up resistor R4 is connected at a point P1 on the communication line 410 on the cable 300, the second position being closer to the source device 100. In addition, at the source device 100, a constant current circuit 112 is connected at a point Q1 on the communication line 410 at the source device 100, and closer to the cable 300. Then, at the source device 100, the voltage of the point Q1 is monitored by a voltage monitoring section 113. In other respects, the transfer system 10J is configured similarly to the transfer system 10D illustrated in FIG. 7.

At the source device 100, when a current is made to flow at the constant current circuit 112, the voltage value of the point Q1 monitored by the voltage monitoring section 113 (the voltage value of the communication line 410) differs depending on whether a compatible cable 300 is connected as in the transfer system 10J illustrated in FIG. 17 or a legacy cable 300' (see FIG. 16) is connected. Accordingly, it becomes possible for the source device 100 to determine whether the connected cable is a compatible cable or an incompatible cable and to perform appropriate operations depending on the cable is a compatible cable or an incompatible cable.

Figure 18:
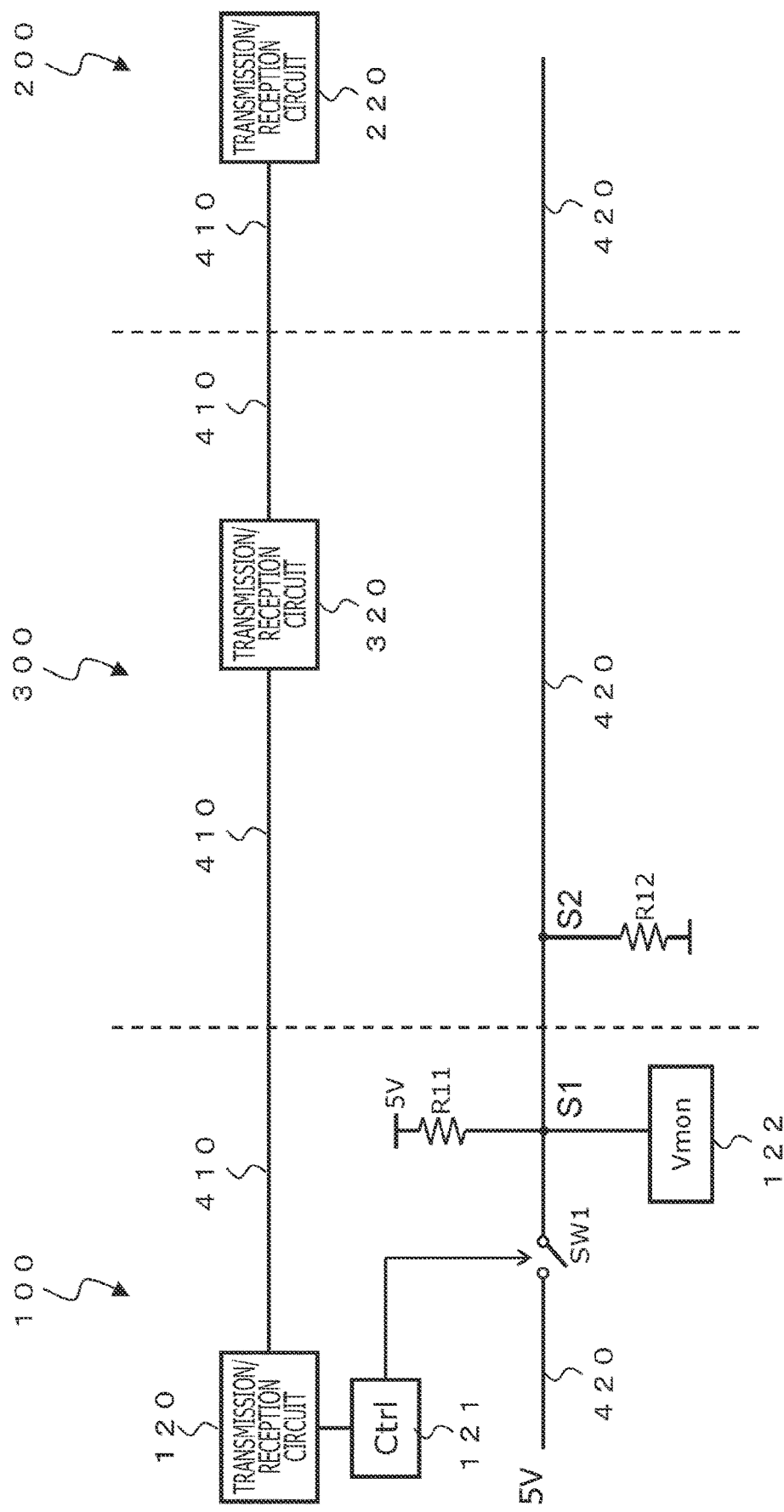
FIG. 18 is a figure illustrating a configuration example of the transfer system configured to use a power supply line to determine whether a compatible cable or an incompatible cable is connected.

Note that whether the connected cable is a compatible cable and an incompatible cable may be determined by the source device 100 by a method in which a line different from the communication line is used. For example, FIG. 18 illustrates a configuration example of a transfer system 10J' configured to make determination by using a power supply line.

The transfer system 10J' has a configuration in which the cable 300 connects the source device 100 and the sink device 200. The source device 100 has a transmission/reception circuit 120, a controller 121, and a voltage monitoring section 122. The transmission/reception circuit 120 singly represents the whole of communication function sections of the source device 100 of the transfer system 10D illustrated in FIG. 7, for example. The controller 121 is a portion that controls the entire source device 100.

At the source device 100, a switch SW1 is inserted at the 5-V power supply line 420. The switch SW is controlled to open or close by the controller 121. At the source device 100, a point S1, which is closer to the cable 300 than the switch SW1 is, is connected to a 5-V power supply via a resistor R11. The voltage monitoring section 122 monitors the voltage of the point S1.

The cable 300 has a transmission/reception circuit 320. The transmission/reception circuit 320 singly represents the whole of communication function sections of the cable 300 of the transfer system 10D illustrated in FIG. 7, for example. On the cable 300, a point S2 on the 5-V power supply line 420 is grounded via a resistor R12. In addition, the sink device 200 has a transmission/reception circuit 220. The transmission/reception circuit 220 singly represents the whole of communication function sections of the sink device 200 of the transfer system 10D illustrated in FIG. 7, for example.

When the source device 100 has detected by means that a cable is connected, the source device 100 opens the switch SW1 as illustrated in the figure, determines whether the connected cable is a compatible cable or an incompatible cable on the basis of the voltage value of the point S2 monitored by the voltage monitoring section 122, and performs an appropriate operation depending on whether the cable is a compatible cable or an incompatible cable. In this case, in a case that the compatible cable 300 is connected as in the transfer system 10J' illustrated in FIG. 18, the voltage value of the point S1 is one that is generated from a voltage division of 5 V between the resistors R11 and R12. On the other hand, in a case that the legacy cable 300' (see FIG. 16), which is an incompatible cable, is connected, the voltage value of the point S1 stays at 5 V.

Tenth Embodiment

Figure 19:
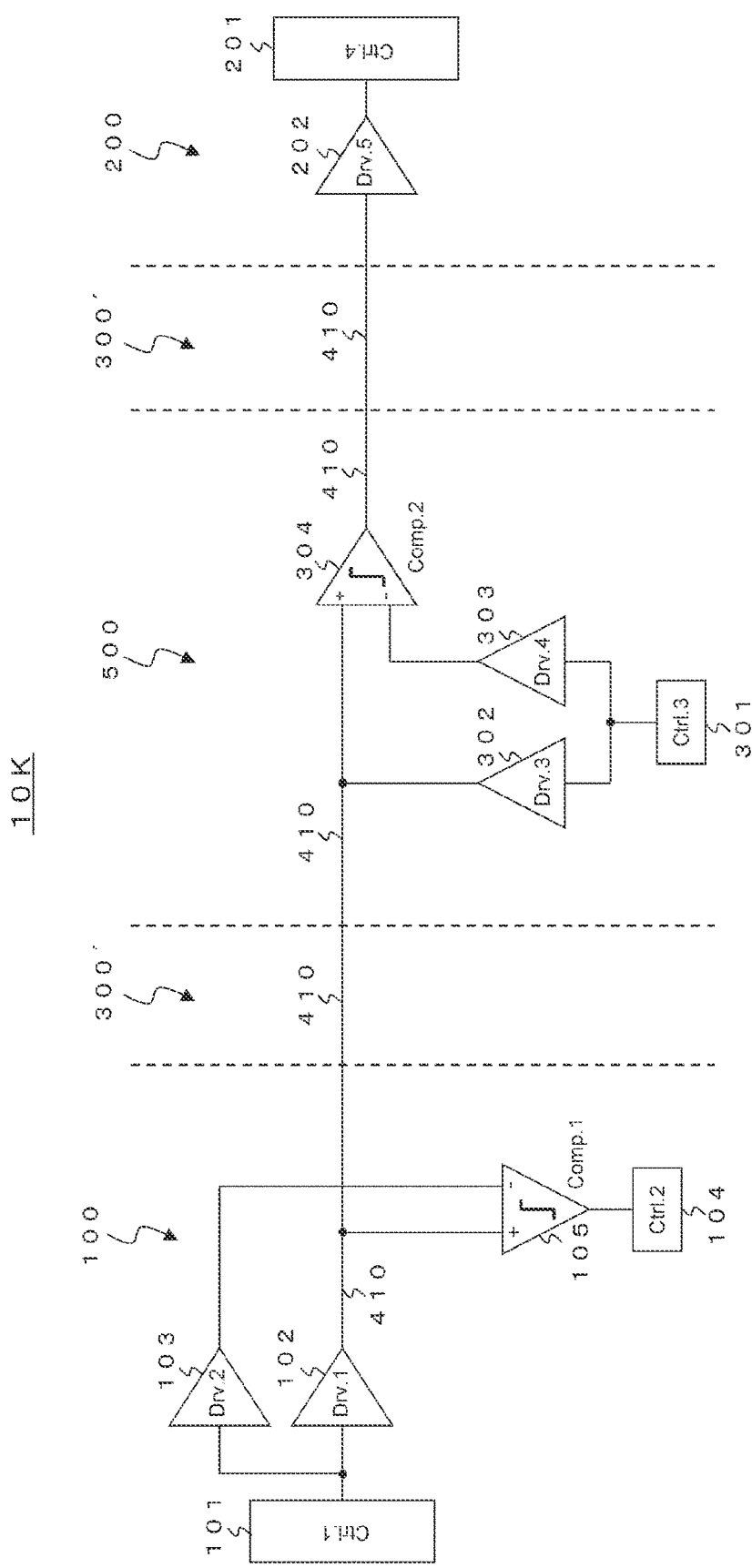
FIG. 19 is a figure illustrating a configuration example of a transfer system as a tenth embodiment.

FIG. 19 illustrates a configuration example of a transfer system 10K as a tenth embodiment. The transfer system 10K has the source device 100, an intermediate device 500 such as a repeater device, the sink device 200, and the legacy cables 300' connecting the source device 100, the intermediate device 500, and the sink device 200.

In the transfer system 10K, full duplex communication is enabled in a segment between the source device 100 and the intermediate device 500. The transfer system 10K is configured such that communication from the source device 100 to the sink device 200 and communication from the intermediate device 500 to the source device 100 can individually be performed independently, and communication contents from the intermediate device 500 to the source device 100 are not conveyed to the sink device 200.

The source device 100 has the controller (Ctrl.1) 101, the driver (Drv.1) 102, the driver (Drv.2) 103, the controller (Ctrl.2) 104, and the comparator (Comp.1) 105. Although not explained in detail, this is similar to the configuration of the source device 100 in the transfer system 10A illustrated in FIG. 1.

The intermediate device 500 has the controller (Ctrl.3) 301, the driver (Drv.3) 302, the driver (Drv.4) 303, and the comparator (Comp.2) 304. Although not explained in detail, this is similar to the configuration of the cable 300 in the transfer system 10A illustrated in FIG. 1.

The sink device 200 has the controller (Ctrl.4) 201, and the driver (Drv.5) 202. Although not explained in detail, this is similar to the configuration of the sink device 200 in the transfer system 10A illustrated in FIG. 1.

Although not explained in detail, communication operations between the source device 100 and the sink device 200 in the transfer system 10K illustrated in FIG. 19 are similar to communication operations between the source device 100 and the sink device 200 in the transfer system 10A illustrated in FIG. 1. In addition, although not explained in detail, communication operations between the source device 100 and the intermediate device 500 in the transfer system 10K illustrated in FIG. 19 are similar to communication operations between the source device 100 and the cable 300 in the transfer system 10A illustrated in FIG. 1.

In such a manner, in the transfer system 10K illustrated in FIG. 19, communication from the source device 100 to the sink device 200 and communication from the intermediate device 500 to the source device 100 can individually be performed without time constraints. In addition, in the transfer system 10K illustrated in FIG. 19, the cancellation function of the comparator 304 prevents communication contents from the intermediate device 500 to the source device 100 from being conveyed to the sink device 200. In this case, the intermediate device 500 performs the conveyance prevention not by logically analyzing the signal contents, and parts costs for memories and the like, examination costs and the like are not necessary, thereby enabling cost reduction.

Note that, although the transfer system 10K illustrated in FIG. 19 can perform communication between the source device 100 and the intermediate device 500, a configuration thereof that can perform communication between the sink device 200 and the intermediate device 500, furthermore a configuration thereof that can perform both communication between the source device 100 and the intermediate device 500 and communication between the sink device 200 and the intermediate device 500, and the like are possible (see FIG. 5, FIG. 6, FIG. 7, FIG. 8, FIG. 11, FIG. 14, FIG. 15, FIG. 17, and FIG. 18).

2. Modification Example

Note that, in the embodiments mentioned above, the transfer systems that connect the source device and the sink device by an HDMI cable are explained as examples. However, because the present technique can similarly be applied also to a cable that uses a mechanism defined in "VESA Plug and Display (P&D) Specification" for a connection between a transmitting device and a receiving device, the present technique can be applied also to DVI, MHL, Display Port and the like. In addition, the present technique can certainly be applied similarly also to USB cables and the like.

In addition, although suitable embodiments of the present disclosure are explained in detail with reference to the attached drawings, the technical scope of the present disclosure is not limited to such examples. It is apparent that those with ordinary knowledge in the technical field of the present disclosure can conceive of various types of modification examples or correction examples within the scope of the technical idea described in the claims, and it is understood that naturally those various types of modification examples or correction examples also belong to the technical scope of the present disclosure.

In addition, the present technique can also have configurations like the ones mentioned below.

(1)

A connection device including:

a communication line for performing communication between a first electronic device and a second electronic device;

a data generating section that generates first data to be transmitted to the first electronic device;

a data input section that inputs the first data to a first position on the communication line; and a first data suppressing section that is provided at a second position on the communication line, the second position being closer to the second electronic device than the first position is, and prevents the first data from being sent to the second electronic device.

(2)

The connection device according to (1), in which the data suppressing section includes a comparator having a positive input terminal, a negative input terminal, and an output terminal, and the positive input terminal is connected to the communication line extending toward the first electronic device, the negative input terminal receives an input of the first data, and the output terminal is connected to the communication line extending toward the second electronic device.

(3)

The connection device according to (1) or (2), in which the data generating section generates the first data in a first state in which data is transmitted from the first electronic device via the communication line to the second electronic device.

(4)

The connection device according to (3), further including:

a first state determining section that determines whether or not the connection device is in the first state.

(5)

The connection device according to (3) or (4), further including:

a data receiving section that receives second data sent from the first electronic device via the communication line in a second state in which data is transmitted from the second electronic device via the communication line to the first electronic device.

(6)

The connection device according to (5), further including: a second state determining section that determines whether or not the connection device is in the second state.

(7)

The connection device according to (5) or (6), further including: a second data suppressing section that prevents the second data from being sent toward the second electronic device.

(8)

An information processing method including:

inputting first data to be transmitted to a first electronic device to a first position on a communication line for performing communication between the first electronic device and a second electronic device; and performing a process for preventing the first data from being sent to the second electronic device at a second position on the communication line, the second position being closer to the second electronic device than the first position is.

(9)

An electronic device including:

a communication line for performing communication with an external device connected via a connection device;

a data generating section that generates first data to be transmitted to the connection device;

a data input section that inputs the first data to a first position on the communication line; and a data receiving section that is provided at a second position on a side of the communication line opposite to the connection device relative to the first position and receives data sent from the external device, in which the data receiving section has a data suppression function for preventing the first data from being taken out as reception data.

(10)

The electronic device according to (9), in which the data receiving section includes a comparator having a positive input terminal, a negative input terminal, and an output terminal, and the positive input terminal is connected to the communication line extending toward the connection device, the negative input terminal receives an input of the first data, and the reception data is obtained from the output terminal.

(11)

The electronic device according to (9) or (10), further including:

a data receiving section that receives second data sent from the connection device via the communication line in a state in which the electronic device is transmitting data through the communication line to the external device connected via the connection device.

(12)

The electronic device according to any one of (9) to (11), further including:

a determining section that determines whether or not the communication line has a connection to the connection device.

(13)

The electronic device according to (12), in which the determining section makes a determination on the basis of a voltage level of the communication line at the time when a predetermined current is made to flow from the communication line.

(14)

The electronic device according to (12), in which the determining section makes a determination on the basis of a voltage level of a power supply line at the time when a switch inserted to the power supply line is opened.

(15)

An information processing method including:

inputting first data to be transmitted to a connection device to a first position on a communication line for performing communication with an external device connected via the connection device; and, at a second position on a side of the communication line opposite to the connection device relative to the first position, preventing the first data from being taken out as reception data and receiving second data sent from the external device.

REFERENCE SIGNS LIST 10A to 10J, 19J', 10K, 10' . . . Transfer system
100 . . . Source device
101, 104, 109 . . . Controller
102, 103, 106, 110, 111 . . . Driver
105, 107, 108 . . . Comparator
112 . . . Constant current circuit
113 . . . Voltage monitoring section
120 . . . Transmission/reception circuit
121 . . . Controller
122 . . . Voltage monitoring section
200 . . . Sink device
201 . . . Controller
202, 203 . . . Driver
220 . . . Transmission/reception circuit
300, 300' . . . Cable
301, 307, 310 . . . Controller
302, 303, 305, 306, 309 . . . Driver
304, 308 . . . Comparator
311, 312 . . . Delay circuit
320 . . . Transmission/reception circuit
410 . . . Communication line
420 . . . Power supply line
500 . . . Intermediate device

The invention claimed is:

1. A connection device, comprising:
a communication line configured to perform communication between a first electronic device and a second electronic device;
a data generating section configured to generate first data to be transmitted to the first electronic device;
a data input section configured to input the first data to a first position on the communication line; and
a first data suppressing section at a second position on the communication line, wherein
the second electronic device is closer to the second position than the first position,
the first data suppressing section is configured to prevent the first data from being sent to the second electronic device,
the first data suppressing section includes a comparator having a positive input terminal, a negative input terminal, and an output terminal,
the positive input terminal is connected to the communication line extending toward the first electronic device,
the negative input terminal is configured to receive an input of the first data, and the output terminal is connected to the communication line extending toward the second electronic device.

2. The connection device according to claim 1, wherein the data generating section is further configured to generate the first data in a first state in which data transmission is from the first electronic device via the communication line to the second electronic device.

3. The connection device according to claim 2, further comprising a first state determining section configured to determine whether the connection device is in the first state.

4. The connection device according to claim 2, further comprising a data receiving section configured to receive second data sent from the first electronic device via the communication line in a second state in which the data transmission is from the second electronic device via the communication line to the first electronic device.

5. The connection device according to claim 4, further comprising a second state determining section configured to determine whether the connection device is in the second state.

6. The connection device according to claim 4, further comprising a second data suppressing section configured to prevent the second data from being sent toward the second electronic device.

7. An information processing method, comprising:
inputting, by a data input section, first data to be transmitted to a first electronic device to a first position on a communication line, wherein the communication line is configured to perform communication between the first electronic device and a second electronic device; and
preventing, by a data suppressing section, the first data from being sent to the second electronic device at a second position on the communication line, wherein
the second electronic device is closer to the second position than the first position,
the data suppressing section includes a comparator having a positive input terminal, a negative input terminal, and an output terminal,
the positive input terminal is connected to the communication line extending toward the first electronic device,
the negative input terminal is configured to receive an input of the first data, and
the output terminal is connected to the communication line extending toward the second electronic device.

8. An electronic device, comprising:
a communication line configured to perform communication with an external device connected via a connection device;
a data generating section configured to generate first data to be transmitted to the connection device;
a data input section configured to input the first data to a first position on the communication line;
a first data receiving section at a second position on a side of the communication line opposite to the connection device relative to the first position, wherein
the first data receiving section is configured to receive data sent from the external device, and
the first data receiving section has a data suppression function configured to prevent the first data from being taken out as reception data; and
a determining section configured to determine whether the communication line has a connection to the connection device.

9. The electronic device according to claim 8, wherein
the first data receiving section includes a comparator having a positive input terminal, a negative input terminal, and an output terminal,
the positive input terminal is connected to the communication line extending toward the connection device,
the negative input terminal is configured to receive an input of the first data, and
the reception data is obtained from the output terminal.

10. The electronic device according to claim 8, further comprising a second data receiving section configured to receive second data sent from the connection device via the communication line in a state in which the electronic device performs data transmission through the communication line to the external device.

11. The electronic device according to claim 8, wherein the determining section is configured to make the determination based on a voltage level of the communication line at a time when a determined current is made to flow from the communication line.

12. The electronic device according to claim 8, wherein the determining section is configured to make the determination based on a voltage level of a power supply line at a time when a switch inserted to the power supply line is opened.

13. An information processing method, comprising:
inputting, by a data input section, first data to be transmitted to a connection device to a first position on a communication line, wherein the communication line is configured to perform communication with an external device connected via the connection device;
preventing, by a data receiving section, the first data from being taken out as reception data, wherein the data receiving section is at a second position on a side of the communication line opposite to the connection device relative to the first position;
receiving, by the data receiving section, second data sent from the external device; and
determining, by a determining section, whether the communication line has a connection to the connection device.

* * * * *